US011632212B2

(12) United States Patent
Xu et al.

(10) Patent No.: US 11,632,212 B2
(45) Date of Patent: Apr. 18, 2023

(54) APPARATUS AND METHOD IN WIRELESS COMMUNICATION SYSTEM AND COMPUTER READABLE STORAGE MEDIUM

(71) Applicant: Sony Group Corporation, Tokyo (JP)

(72) Inventors: Jin Xu, Beijing (CN); Dongru Li, Beijing (CN); Hang Yang, Beijing (CN); Xiaofeng Tao, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 76 days.

(21) Appl. No.: 17/331,633

(22) Filed: May 27, 2021

(65) Prior Publication Data

US 2021/0297217 A1    Sep. 23, 2021

Related U.S. Application Data

(63) Continuation of application No. 16/628,681, filed as application No. PCT/CN2018/098294 on Aug. 2, 2018, now Pat. No. 11,050,537.

(30) Foreign Application Priority Data

Aug. 9, 2017  (CN) .......................... 201710676184.7

(51) Int. Cl.
*H04L 5/00* (2006.01)
*H04B 7/06* (2006.01)

(52) U.S. Cl.
CPC ......... *H04L 5/0048* (2013.01); *H04B 7/0626* (2013.01); *H04L 5/0057* (2013.01)

(58) Field of Classification Search
CPC ................. H04L 5/0048; H04L 5/0057; H04L 5/0007; H04L 5/0094; H04L 5/0051; H04L 5/001;
(Continued)

(56) References Cited

U.S. PATENT DOCUMENTS

2014/0341313 A1    11/2014  Kim et al.
2018/0234959 A1    8/2018   Ahn et al.
2020/0028609 A1    1/2020   Ahn et al.

FOREIGN PATENT DOCUMENTS

CN         106576253 A       4/2017
WO      WO-2012060067 A1    5/2012

OTHER PUBLICATIONS

Huawei UL SRS design for beam management and CSI acquisition (Year: 2017).*
Cohere Technologies, Structure of PUCCH in long-duration[online], 3GPP TSG RAN WG1 #89 R1-1708314, May 6, 2017.
(Continued)

*Primary Examiner* — Ayanah S George
(74) *Attorney, Agent, or Firm* — Xsensus LLP

(57) ABSTRACT

An apparatus and method in a wireless communication system and a computer readable storage medium. The apparatus comprises a processing circuit, which is configured to: configure a sounding reference signal (SRS) mapping structure for a user equipment on the basis of at least the number of antenna ports of the user equipment and the number of transmitting beams and/or receiving beams to be scanned; and notify the user equipment of the SRS mapping structure, wherein the SRS mapping structure at least comprises SRS resource settings for achieving uplink beam management and channel state information (CSI) acquisition at the same time, thereby reducing the system time delay and improving the uplink resource utilization rate.

16 Claims, 14 Drawing Sheets

(58) Field of Classification Search
CPC ...... H04B 7/0626; H04B 7/06; H04B 7/0632; H04B 7/0682; H04W 72/04; H04W 72/043; H04W 72/046
See application file for complete search history.

(56) References Cited

OTHER PUBLICATIONS

Ericsson, SRS Design[online], 3GPP TSG RAN WG1 #89 R1-1708709, May 6, 2017.
Intel Corporation, Further discussion on SRS for NR[online], 3GPP TSG RAN WG1 #88 R1-1702214, Feb. 7, 2017.
Lenovo, Motorola Mobility, Discussion of SRS resource configuration [online], 3GPP TSG RAN WG1 #89 R1-1707764, May 6, 2017.
LG Electronics, On SRS design and related operations [online], 3GPP TSG RAN WG1 adhoc_NR_AH_1706 R1-1710298, Jun. 17, 2017.
Samsung, Discussion on UL beam management[online], 3GPP TSG RAN WG1 #88b R1-1705341, Mar. 24, 2017.
ZTE, Discussion on SRS design for eLAA UL[online], 3GPP TSG-RAN WG1#85 R1-164596, May 13, 2016.
International Search Report and Written Opinion dated Sep. 21, 2018 for PCT/CN2018/098294 filed on Aug. 2, 2018, 11 pages including English Translation of the International Search Report.
CATT, "Further discussion on SRS transmission," 3GPP TSG RAN WG1 Meeting No. 89, R1-1707490, Hangzhou, P. R. China, May 15-19, 2017, 4 pages.
Huawei and Hisilicon, "UL SRS design for beam management and CSI acquisition," 3GPP TSG RAN WG1 NR Ad Hoc Meeting, R1-1709936, Qingdao, China, Jun. 27-30, 2017, 8 pages.
Huawei and Hisilicon, "UL SRS design for CSI acquisition and beam management," 3GPP TSG RAN WG1 NR Ad Hoc Meeting, R1-1700074, Spokane, USA, Jan. 16-20, 2017, 8 pages.
Samsung, "SRS design for NR," 3GPP TSG RAN WG1 NR Ad-Hoc No. 2, R1-1710688, Qingdao, China, Jun. 27-30, 2017, 5 pages.

* cited by examiner

APPARATUS AND METHOD IN WIRELESS COMMUNICATION SYSTEM AND COMPUTER READABLE STORAGE MEDIUM

CROSS-REFERENCE TO RELATED APPLICATIONS

This application is a continuation of U.S. application Ser. No. 16/628,681, filed Jan. 6, 2020, which is based on PCT filing PCT/CN2018/098294, filed Aug. 2, 2018, which claims priority to Chinese Patent Application No. 201710676184.7, filed with the Chinese Patent Office on Aug. 9, 2017, the entire contents of each are incorporated herein by reference.

FIELD

The present disclosure generally relates to the technical field of the wireless communication, and in particular to the design and implementation of a sounding reference signal (SRS) mapping structure in the context of New Radio Access Technology-Multiple-input Multiple-Output (NR MIMO).

BACKGROUND

In NR MIMO, SRS implements two functions, including an uplink beam management function and a channel state information (CSI) acquisition function. At present, it has been proposed to design SRS mapping structures with independent functions to implement the above two functions, respectively. However, such independent SRS mapping structures have the defects of a large system delay and a low uplink resource utilization ratio. Thereby, for some application scenarios which are sensitive to the system delay and for which there is shortage of the uplink resource, the existing SRS mapping structure cannot satisfy communication demands.

SUMMARY

Brief summary of the present disclosure is given hereinafter, so as to provide basic understanding for some aspects of the present disclosure. However, it is to be understood that this summary is not an exhaustive overview of the present disclosure. It is neither intended to identify key or critical parts of the present disclosure, nor intended to limit the scope of the present disclosure. It merely functions to present some concepts of the present disclosure in a simplified form to be used as a prelude to a more detailed description stated later.

In view of above, an object of at least one aspect of the present disclosure is to provide an device and a method in a wireless communication system and a computer readable storage medium for configuring an SRS mapping structure which can implement uplink beam management and CSI acquisition at the same time so as to reduce the system delay and improve the uplink resource utilization ratio.

According to an aspect of the present disclosure, there is provided a device in a wireless communication system. The device includes processing circuitry configured to: configure, based on at least number of antenna ports of a user equipment and number of transmission beams and/or reception beams to be swept, an SRS mapping structure for the user equipment; and notify the SRS mapping structure to the user equipment, where the SRS mapping structure includes at least SRS resource setting for implementing both uplink beam management and CSI acquisition at the same time.

According to another aspect of the present disclosure, there is also provided a device in a wireless communication system. The device includes processing circuitry further configured to: control, according to an SRS mapping structure notified by a base station, a user equipment to transmit an SRS to the base station on corresponding time-frequency resources, where the SRS mapping structure includes at least SRS resource setting for implementing both uplink beam management and CSI acquisition at the same time.

According to yet another aspect of the present disclosure, there is also provided a method in a wireless communication system. The method includes: configuring, based on at least number of antenna ports of a user equipment and number of transmission beams and/or reception beams to be swept, an SRS mapping structure for the user equipment; and notifying the SRS mapping structure to the user equipment, where the SRS mapping structure includes at least SRS resource setting for implementing both uplink beam management and CSI acquisition at the same time.

According to still another aspect of the present disclosure, there is also provided a method in a wireless communication system. The method includes: controlling, according to an SRS mapping structure notified by a base station, a user equipment to transmit an SRS to the base station on corresponding time-frequency resources, where the SRS mapping structure includes at least SRS resource setting for implementing both uplink beam management and CSI acquisition at the same time.

According to still another aspect of the present disclosure, there is also provided a computer readable storage medium storing executable instructions which, when being executed by a computer, cause the computer to perform the above-described method in the wireless communication system.

According to other aspects of the present disclosure, there are also provided computer program codes and a computer program product for realizing the above-described method(s) according to the present disclosure.

According to the embodiments of the present disclosure, by configuring an SRS mapping structure for implementing both uplink beam management and CSI acquisition at the same time, the system delay can be reduced while the uplink transmission rate and the uplink resource utilization ratio are improved, as compared to the independent SRS mapping structures which realize the above two functions, respectively.

Other aspects of the embodiments of the present disclosure are given in the following specification, in which the detailed description is used for fully disclosing, without limiting, preferred embodiments of the present disclosure.

BRIEF DESCRIPTION OF THE DRAWINGS

The present disclosure may be understood better with reference to the detailed description given below in conjunction with the drawings. The same or similar components are indicated by the same or similar reference numbers throughout all the drawings. The drawings together with the following detailed description are incorporated into and form a part of the specification and serve to further illustrate the preferred embodiments of the present disclosure and to explain the principle and advantages of the present disclosure by way of example. In the drawings.

DETAILED DESCRIPTION OF EMBODIMENTS

Figure 1:
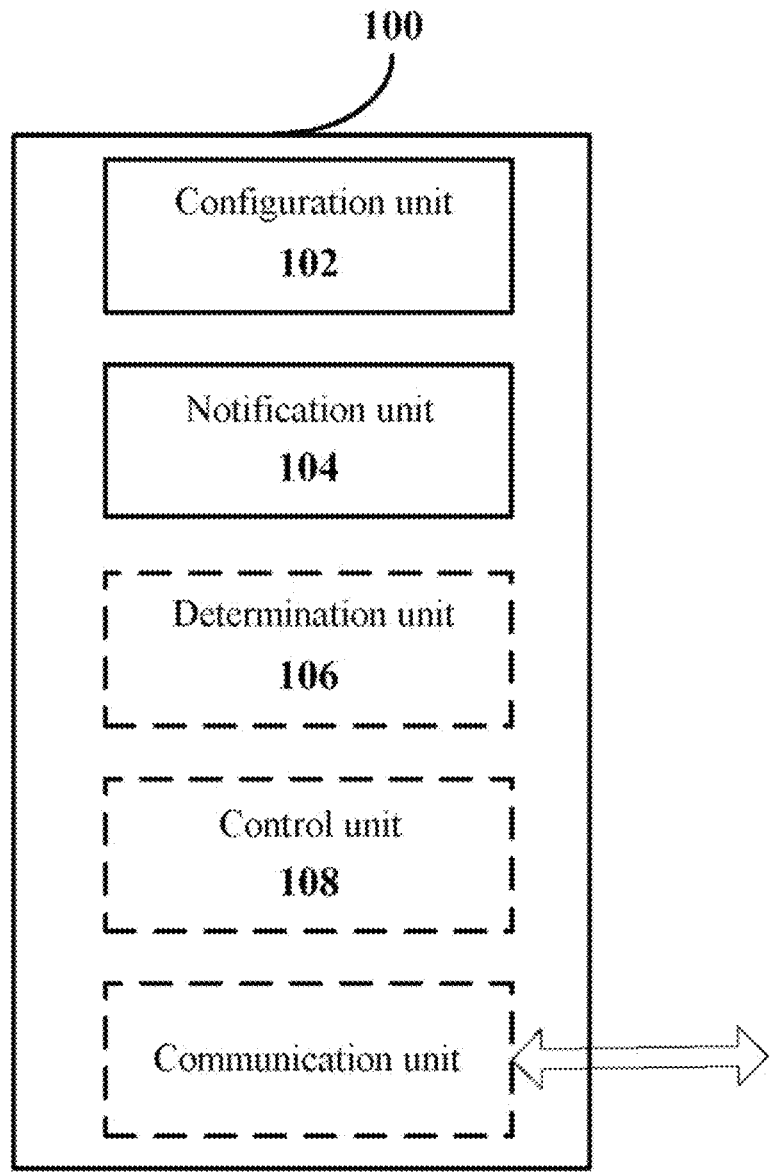
FIG. 1 is a block diagram showing an example of a functional configuration of a device on a base station side in a wireless communication system according to an embodiment of the present disclosure.

Exemplary embodiments of the present disclosure will be described below in conjunction with the drawings. For the sake of clarity and conciseness, not all the features of practical embodiments are described in the specification. However, it should be understood that numerous embodiment-specific decisions shall be made during developing any of such practical embodiments so as to implement the developer's specific goals, for example, to comply with system and business-related constraining conditions which will vary from one embodiment to another. Furthermore, it should also be understood that although the development work may be very complicated and time-consuming, for those skilled in the art benefiting from the present disclosure, such development work is only a routine task.

It is further to be noted here that, to avoid obscuring the present disclosure due to unnecessary details, only the device structure and/or processing step closely related to the solution of the present disclosure are shown in the drawings, and other details less related to the present disclosure are omitted.

Hereinafter, embodiments of the present disclosure will be described in detail with reference to FIGS. 1 to 14. Hereinafter, the description will be made in the following order.

1. Example of a configuration on a base station side according to an embodiment of the present disclosure
  1-1. Summary of an example of a configuration of the SRS mapping structure according to an embodiment of the present disclosure
  1-2. Parameter configuration and notification of the SRS mapping structure according to an embodiment of the present disclosure
    1-2-1. Port mapping of an SRS resource
    1-2-2. Sub-band SRS bandwidth
    1-2-3. Sampling factor and comb offset
    1-2-4. Frequency hopping manner of a sub-band SRS
    1-2-5. Other SRS resource settings
    1-2-6. Notification of an SRS mapping structure
2. Example of a configuration on a user equipment side according to an embodiment of the present disclosure
3. Signaling design and interaction according to an embodiment of the present disclosure
4. Methods in a wireless communication system according to an embodiment of the present disclosure
  4-1. Method on a base station side
  4-2. Method on a user equipment side
5. Computing device for implementing the device(s) and the method(s) according to the embodiments of the present disclosure
6. Application examples of the technology according to the present disclosure
  6-1. Application example of a base station
  6-2. Application example of the user equipment

[1. Example of a Configuration on a Base Station Side According to an Embodiment of thePresent Disclosure]

(1-1. Summary of an Example of a Configuration of the SRS Mapping Structure According to an Embodiment of the Present Disclosure)

FIG. 1 is a block diagram showing an example of a functional configuration of a device on a base station side in a wireless communication system according to an embodiment of the present disclosure.

As shown in FIG. 1, a device 100 according to the embodiment may include a configuration unit 102 and a notification unit 104.

The configuration unit 102 may be configured to configure, based on at least number of antenna ports of a user equipment and number of transmission beams and/or reception beams to be swept, an SRS mapping structure for the user equipment, in which the SRS mapping structure includes at least SRS resource setting for implementing both uplink beam management and CSI acquisition at the same time.

The notification unit 104 may be configured to notify the configured SRS mapping structure to the user equipment.

For the beam management function, the spatial parameters of each physical resource block (PRB) in the frequency domain are similar, and thus, it is not required to perform a broadband measurement. Hence, the SRS required by this function is suitable to be mapped onto the same sub-carrier for consideration of measurement fairness. On the other hand, for the CSI acquisition function, since it is required to cover the whole transmission bandwidth to obtain accurate CSI, and also due to the limitations of transmission power for the user equipment, broadband measurement should be implemented by using multiple sub-band SRSs and the frequency hopping technology.

Based on the above, preferably, the configuration unit 102 is further configured to configure the SRS mapping structure so that the above SRS resource setting includes K groups of SRS resources and each group of SRS resources have N ports, in which K is a positive integer corresponding to the number of the transmission beams or the reception beams to be swept, and N is a positive integer corresponding to the number of the antenna ports of the user equipment.

Preferably, each group of SRS resources includes one or more sub-band SRS resources and each sub-band SRS resource has N ports.

Corresponding to the downlink beam management procedure in NR MIMO, the uplink beam management in NR MIMO may include three procedures, i.e. a U1 procedure, a U2 procedure, and a U3 procedure. In the U1 procedure, the transmission beam sweeping and reception beam sweeping in an uplink direction are performed at the same time. In the U2 procedure, only the uplink reception beam sweeping is performed. In the U3 procedure, only the uplink transmission beam sweeping is performed. An example of a configuration of the SRS mapping structure for each process will be described in detail below in conjunction with FIG. 2.

Figure 2:
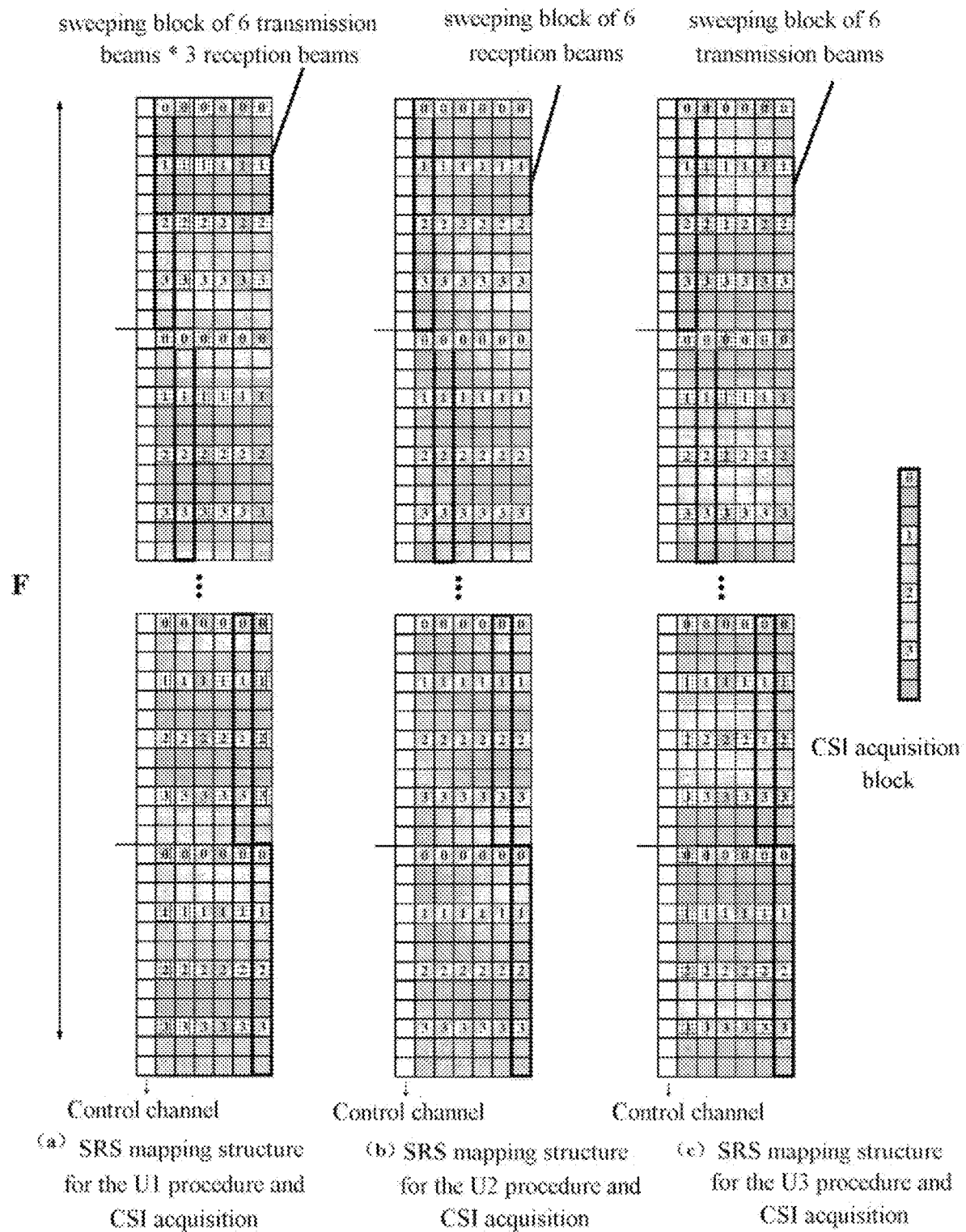
FIG. 2 is a schematic diagram showing an example of a configuration of the SRS mapping structure according to an embodiment of the present disclosure.

FIG. 2 is a schematic diagram showing an example of a configuration of the SRS mapping structure according to an embodiment of the present disclosure. Part (a) in FIG. 2 is a schematic diagram showing an example of the SRS mapping structure which can realize the U1 procedure and CSI acquisition at the same time. Part (b) in FIG. 2 is a schematic diagram showing an example of the SRS mapping structure which can realize the U2 procedure and CSI acquisition at the same time. Part (c) in FIG. 2 is a schematic diagram showing an example of the SRS mapping structure which can realize the U3 procedure and CSI acquisition at the same time.

As a preferred example, the configuration unit 102 may be further configured to: configure, for a U1 procedure in which transmission beam sweeping and reception beam sweeping are performed at the same time, the SRS mapping structure, so that each group of SRS resources correspond to one transmission beam to be swept to realize the transmission beam sweeping in a time domain, and that a sampling factor is larger than or equal to the number of the reception beams to be swept to construct an IFDMA model so as to realize the reception beam sweeping in a frequency domain and realize the CSI acquisition.

Part (a) in FIG. 2 shows an example of the SRS mapping structure used for the U1 procedure and CSI acquisition. As shown in FIG. 2, the horizontal direction represents a time domain, and the vertical direction represents a frequency domain. The SRS mapping structure includes a total of six groups of SRS resources (corresponding to six transmission beams to be swept), and resource elements (REs) occupied by respective groups of SRS resources are filled with different patterns so as to distinguish different groups of SRS resources. The number noted in the square representing an RE represents the port number, which also applies to the subsequent description. Each group of SRS resources correspond to one transmission beam to be swept, so that the sweeping of six transmission beams can be realized in the time domain. The sampling factor (SF) is 3 (corresponding to (larger than or equal to) the number of reception beams to be swept), and an IFDMA (Interleaved Frequency Division Multiple Access) model is constructed based on the sampling factor, so that the sweeping of three reception beams can be realized in the frequency domain. The IFDMA model herein indicates allocating SRS signals to the idle REs in a same OFDM symbol at equal intervals in the frequency domain. As shown in FIG. 2, the REs filled with shadow indicate that these REs are used to construct an IFDMA model. In this way, as indicated by the boxes in part (a) of FIG. 2, each beam sweeping block can implement the sweeping of six transmission beams*three reception beams.

For the CST acquisition function, each group of SRS resources includes four SRS ports (port 0, port 1, port 2, and port 3, corresponding to the antenna ports of the user equipment, respectively) so as to construct a CSI acquisition block for implementing CSI acquisition. An example of one CSI acquisition block is as shown on the far right of FIG. 2. In this way, in the example shown in part (a) of FIG. 2, each group of SRS resources includes six CSI acquisition blocks which perform frequency hopping according to a predetermined frequency hopping manner (for example, as shown in FIG. 2, performing continuous resource block (RB) frequency hopping while performing sequential circular shifting to the right in the time domain) to cover the whole uplink transmission bandwidth, so that an accurate CSI acquisition result can be obtained.

In order to better illustrate the CSI acquisition performed by a CSI acquisition block in a frequency hopping manner of circularly shifting to the right, all the CSI acquisition blocks which belong to the first group of SRS resources are circled in FIG. 2 by a bold solid line frame. It can be understood that each CSI acquisition block only occupies a part of the bandwidth of one group of SRS resources, and thus such a CST acquisition block may also be referred to as a sub-band SRS resource hereinafter, and the length of each CSI acquisition block may be referred to as a sub-band SRS bandwidth. In addition, it should be further understood that, although not shown in FIG. 2, each of the sub-band SRS resources among the second to sixth groups of SRS resources is mapped onto the time-frequency resources by using the same frequency hopping manner.

As another preferred embodiment, the configuration unit 102 may be further configured to: configure, for a U2 procedure in which only reception beam sweeping is performed, the SRS mapping structure, so that respective groups of SRS resources correspond to the same transmission beam to realize the reception beam sweeping in a time domain, and that an IFDMA model is constructed according to a sampling factor to realize the CSI acquisition.

Part (b) in FIG. 2 shows an example of a configuration of the SRS mapping structure for the U2 procedure and CSI acquisition. In the SRS mapping structure shown in part (b) of FIG. 2, each group of SRS resources are filled with the same pattern to represent that each group of SRS resources correspond to the same transmission beam, that is, the configuration is such that the user equipment transmits an SRS to the base station by using the same transmission beam every time so that the sweeping of the six reception beams can be realized in the time domain. For the CSI acquisition function, since only the reception beam sweeping is performed in the example shown in part (b) of FIG. 2, the IFDMA model constructed with the sampling factor 3 is only used for realizing CSI acquisition. This is because that an intensive SRS is required in order to obtain an accurate CSI result.

As another preferred embodiment, the configuration unit 102 may be further configured to: configure, for a U3 procedure in which only transmission beam sweeping is performed, the SRS mapping structure, so that each group of SRS resources correspond to one transmission beam to be swept to realize the transmission beam sweeping in a time domain, and that an IFDMA structure is constructed according to a sampling factor to realize the CSI acquisition.

Part (c) in FIG. 2 shows an example of a configuration of the SRS mapping structure for the U3 procedure and CSI acquisition. From only the patterns, the SRS mapping structure shown in part (c) of FIG. 2 is generally the same as the SRS mapping structure shown in part (a) and part (b) of FIG. 2, with the difference only lying in that, for the beam management function, in the SRS mapping structure shown in part (c) of FIG. 2, respective groups of SRS resources correspond to different transmission beams to be swept, and the base station receives an SRS from different transmission beams of the user equipment by using the same reception beam every time, such that sweeping of six transmission beams can be realized in a time domain. For the CSI acquisition function, since only the transmission beam sweeping is performed in the example shown in part (c) of FIG. 2, the IFDMA model constructed with the sampling factor 3 is only used to realize CSI acquisition (this is because that an intensive SRS is required in order to obtain an accurate CSI result) and it is not required to simultaneously perform reception beam sweeping in a frequency domain as shown in part (a) of FIG. 2.

It is to be noted that, the contents of the SRS (that is, the SRS contents corresponding to each group of SRS resources) transmitted by the user equipment using the same transmission beam or different transmission beams may be the same or different, which is not limited in the present disclosure.

According to the SRS mapping structure shown in FIG. 2, for the beam management function, the sweeping procedure of six transmission beams on the user equipment side and three reception beams on the base station side is realized by the structure (a), the sweeping procedure of six reception beams on the base station side is realized by the structure (b), and the sweeping procedure of six transmission beams on the user equipment side is realized by the structure (c); for the CST acquisition function, eighteen groups of CST acquisition results with the combination of six transmission beams and three reception beams are obtained by the structure (a), six groups of CSI acquisition results corresponding to six reception beams are obtained by the structure (b), and six groups of CST acquisition results corresponding to six transmission beams are obtained by the structure (c).

Referring back to FIG. 1, the device 100 may further include a determination unit 106 (optionally, shown in a dashed line frame). The determination unit 106 may be configured to determine an optimal transmission-reception beam pair from the transmission beams and/or reception beams to be swept according to a measurement result for a SRS from the user equipment, and determine a measurement result corresponding to the determined optimal transmission-reception beam pair as the CST acquisition result.

Then, the notification unit 104 may notify the determined optimal transmission-reception beam pair and the CSI acquisition result to the user equipment. In this way, the beam management function and CSI acquisition function are realized at the same time based on the SRS mapping structure shown in FIG. 2, such that the system delay can be reduced, and the uplink resource utilization ratio can be improved.

In addition, preferably, the device 100 may further include a control unit 108 (optionally, shown in a dashed line frame). The control unit 108 may be configured to control a base station, for the U1 procedure or the U2 procedure, to receive a SRS from the user equipment utilizing different reception beams to be swept so as to realize reception beam sweeping; and control the base station, for the U3 procedure, to receive a SRS from the user equipment utilizing the same reception beam so as to realize transmission beam sweeping.

(1-2. Parameter Configuration and Notification of the SRS Mapping Structure According to an Embodiment of the Present Disclosure)

Here, it should be understood that, although FIG. 2, as an example, shows SRS mapping structures for realizing both uplink beam management and CSI acquisition at the same time for different uplink beam management procedures, this is only an example rather than a limitation. Moreover, those skilled in the art can appropriately amend the above SRS mapping structure according to the principle of the present disclosure in combination with the practical situation. Factors, such as the differences of the number of antenna ports of the user equipment, the port mapping schemes, the sub-band SRS bandwidths, a position of an OFDM symbol occupied by an SRS, the frequency hopping manner, the comb offset, and an arrangement of other SRS resource settings in addition to the above SRS resources settings for realizing uplink beam management and CSI acquisition at the same time, will all make the actually configured SRS mapping structure different. In other words, in an SRS mapping structure, at least the factors listed above are configurable. The configuration of the basic parameters of the SRS mapping structure will be described in detail below in conjunction with the drawings.

(1-2-1. Port Mapping of an SRS Resource)

In NR MIMO, the number of antenna ports of the user equipment may be an integer of 1, 2, 4, 8, or 12 or the like, and thus, correspondingly, the number of ports of each group of SRS resources above may also be an integer of 1, 2, 4, 8, or 12 or the like. Each sub-band SRS in each of SRS resources having N (N=1, 2, 4, 8, 12, or the like.) ports may occupy one or more continuous OFDM symbols (the number of occupied OFDM symbols can be represented, for example, as F, F being an arbitrary integer from 1 to 13) in one time slot. Each OFDM symbol of the one or more continuous OFDM symbols can be distributed in one or more continuous RBs (that is, can be arranged across RBs).

(1-2-2. Sub-Band SRS Bandwidth)

Referring back to FIG. 1, the configuration unit 102 may configure a sub-band SRS bandwidth based on number of ports of each group of SRS resources, number of OFDM symbols occupied by each sub-band SRS resource of each group of SRS resources, and a sampling factor, and map, based on a predetermined frequency hopping manner and the sub-band SRS bandwidth, each group of SRS resources onto time-frequency resources so as to configure the SRS mapping structure, so that each group of SRS resources cover the whole uplink transmission bandwidth. The sub-band SRS bandwidth is an integral multiple of a bandwidth occupied by each resource block (RB). For example, as an example, the sub-band SRS bandwidth $W_{subband}$ may be calculated based on the following formula.

$$\begin{cases} n \cdot (N \cdot SF)/F = W_{subband} \\ W_{subband} \bmod 1 = 0 \end{cases}$$

In the formula, n is an arbitrary positive integer, N represents the number of ports of each group of SRS resources, SF represents a sampling factor, and F represents the number of OFDM symbols occupied by each sub-band SRS resource. The unit of $W_{subband}$ is RB, that is, the sub-band SRS bandwidth $W_{subband}$ is an integral multiple of a bandwidth occupied by each RB.

Preferably, the user equipment may also transmit a sub-band bandwidth configuration request to a base station based on the communication requirement of the user equipment. The sub-band bandwidth configuration request may be included in a dedicated signaling (for example, SRS_Subband_Request) or an uplink scheduling request signaling (Scheduling Request, SR), and indicate in an explicit or implicit manner, to the base station, the sub-band SRS bandwidth that the user equipment expects to configure, so that the configuration unit 102 of the device 100 on the base station side can further configure the sub-band SRS bandwidth according to a sub-band bandwidth configuration request from the user equipment, that is, reasonably setting the value of the variable n in the above formula.

Then, the notification unit 104 may notify the configured sub-band SRS bandwidth to the user equipment in an explicit or implicit manner by using a dedicated signaling (for example, BS_SRS_Subband_Response corresponding to the above dedicated signaling SRS_Subband_Request) or an uplink grant signaling (UL grant).

Preferably, the above dedicated signaling or the uplink grant signaling may further include a starting RB number and an ending RB number of the SRS resource setting in the configured SRS mapping structure. Alternatively, the above dedicated signaling or the uplink grant signaling may further include an uplink transmission bandwidth and a starting RB number of the SRS resource setting in the configured SRS mapping structure. In this way, the position of each sub-band SRS can be determined based on the notified sub-band SRS bandwidth and the frequency hopping manner.

Alternatively, the configured sub-band SRS bandwidth, a starting RB number, an ending RB number, uplink transmission bandwidth, and so on may also be notified to the user equipment by a combination of the above explicit manner(s) and implicit manner(s).

(1-2-3. Sampling Factor and Comb Offset)

A sampling factor (SF) can be set based on the number of the reception beams to be swept. For example, SF is a positive integer larger than or equal to the number of the reception beams to be swept for constructing an IFDMA model so as to realize reception beam sweeping in a frequency domain. On the other hand, in the U2 procedure and U3 procedure, even if it is not required to perform reception beam sweeping in a frequency domain, a sampling factor (SF) may also be set such that the designed SRS mapping structure has a more general applicability.

The comb offset can be set as an integer larger than or equal to zero and smaller than a sampling factor SF. A base station can configure the same or different comb offsets for different user equipment. Moreover, interference among the user equipments can be reduced by configuring different comb offsets.

Figure 3:
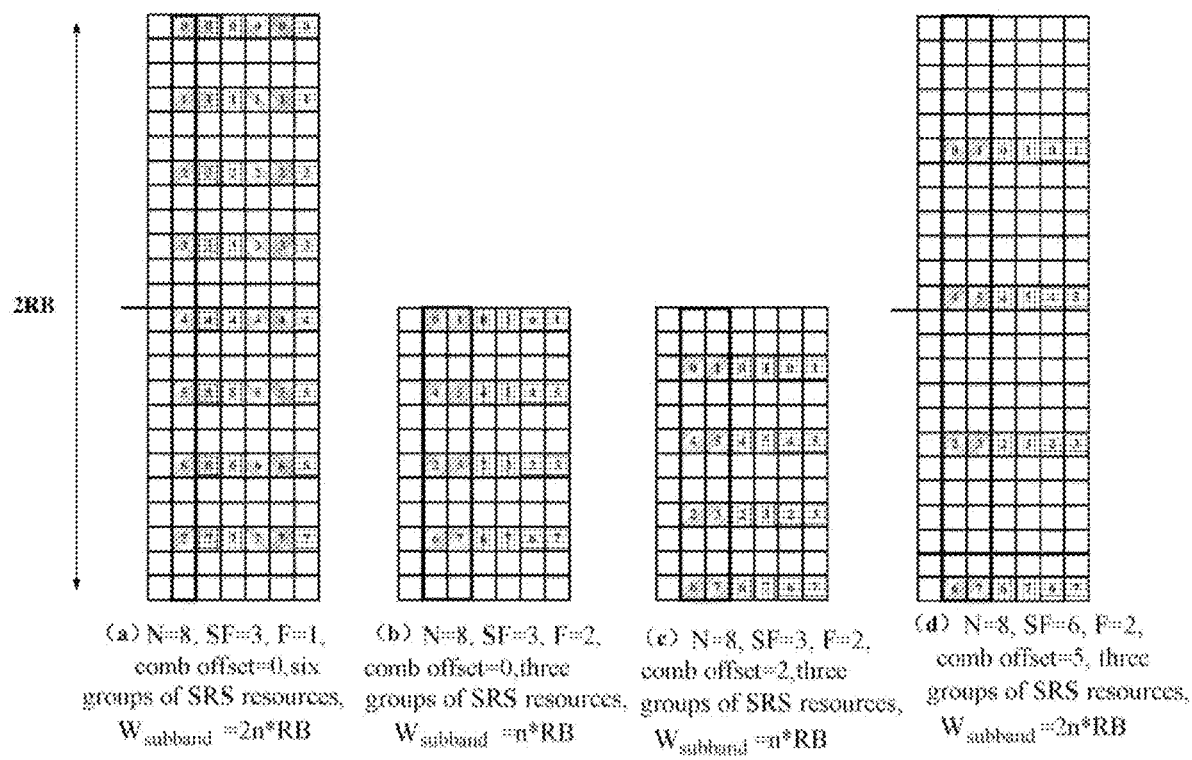
FIG. 3 is a schematic diagram showing an example of the SRS mapping structure with different parameter configurations according to an embodiment of the present disclosure.

FIG. 3 is a schematic diagram showing an example of the SRS mapping structure having different parameter configurations according to an embodiment of the present disclosure.

In the example shown in FIG. 3, an example of an SRS mapping structure having different parameter configurations is shown by taking each group of SRS resources having eight ports as an example.

In the SRS mapping structure shown in part (a) of FIG. 3, there are six groups of SRS resources, and each group of SRS resources includes eight ports and occupies one OFDM symbol (that is, F=1) across two RBs; sampling factor SF=3, and comb offset=0. Based on the above calculation formula, in the example shown in part (a) of FIG. 3, the sub-band SRS bandwidth can be an integral multiple of 2RB. Moreover, part (a) in FIG. 3 shows an example of an SRS mapping structure in which sub-band SRS bandwidth is 2RB.

In the SRS mapping structure shown in part (b) of FIG. 3, there are three groups of SRS resources, and each group of SRS resources includes eight ports and occupies two OFDM symbols (that is, F=2) in one RB; sampling factor SF=3, and comb offset=0. Based on the above calculation formula, in the example shown in part (b) of FIG. 3, the sub-band SRS bandwidth can be an integral multiple of 1RB. Moreover, part (b) in FIG. 3 shows an example of an SRS mapping structure in which sub-band SRS bandwidth is 1RB.

The SRS mapping structure shown in part (c) of FIG. 3 is substantially the same as the SRS mapping structure shown in part (b) of FIG. 3. The only difference lies in that, in the example shown in part (c) of FIG. 3, comb offset-=2. Thus, compared with the example shown in part (b) of FIG. 3 (in which the starting sub-carrier number occupied by the SRS mapping structure is 0), the starting sub-carrier number occupied by the SRS mapping structure shown in part (c) of FIG. 3 is 2. This facilitates reducing the mutual interference of SRS transmission among the user equipments.

In the SRS mapping structure shown in part (d) of FIG. 3, there are three groups of SRS resources, and each group of SRS resource includes eight ports and occupies two OFDM symbols (that is, F=2) across two RBs; sampling factor SF=6, and comb offset=5. Based on the above calculation formula, in the example shown in part (d) of FIG. 3, the sub-band SRS bandwidth can be an integral multiple of 2RB. Moreover, part (d) in FIG. 3 shows an example of an SRS mapping structure in which sub-band SRS bandwidth is 2RB.

Here, it should be noted that, in the examples shown in part (b) to (d) of FIG. 3, in order to form an orthogonal cross-polarized antenna, it is preferable that the antenna ports are staggered in an appropriate manner when port mapping is performed. For example, instead of arranging the antenna ports in the order of (0, 1), (2, 3), (4, 5), and (6, 7), the antenna ports are arranged in accordance with an order of (0, 1), (4, 5), (2, 3) and (6, 7). Of course, such a port mapping manner is only an example rather than a limitation. Those skilled in the art can also make appropriate adjustments based on practical application scenarios.

In addition, it should be further noted that, FIG. 3 only shows, as an example, an example of a possible configuration of a SRS mapping structure having different parameter configurations. Those skilled in the art design an appropriate SRS mapping structure according to the practical application scenarios and the principle of the present disclosure, as long as the designed SRS mapping structure can realize uplink beam management and CSI acquisition at the same time.

(1-2-4. Frequency Hopping Manner of a Sub-Band SRS)

Preferably, the frequency hopping manner of the sub-band SRS supports continuous RB frequency hopping and cross-RB frequency hopping. Moreover, intra-time slot frequency hopping and inter-time slot frequency hopping are also supported. For example, the frequency hopping manner of circularly shifting to the right shown in FIG. 2 is intra-time slot continuous RB frequency hopping. That is, all sub-band SRSs of each group of SRS resources are distributed in the same time slot, and the frequency hopping is performed between adjacent RBs every time.

More generally, for intra-time slot frequency hopping, frequency hopping at the h-OFDM symbol level may be supported, where h is equal to the number of OFDM symbols occupied by sub-band SRSs of each group of SRS resources having N ports, that is, h=F. Taking the frequency hopping manner shown in FIG. 2 as an example, the frequency hopping manner shown in FIG. 2 is frequency hopping at the 1-OFDM symbol level.

Figure 4:
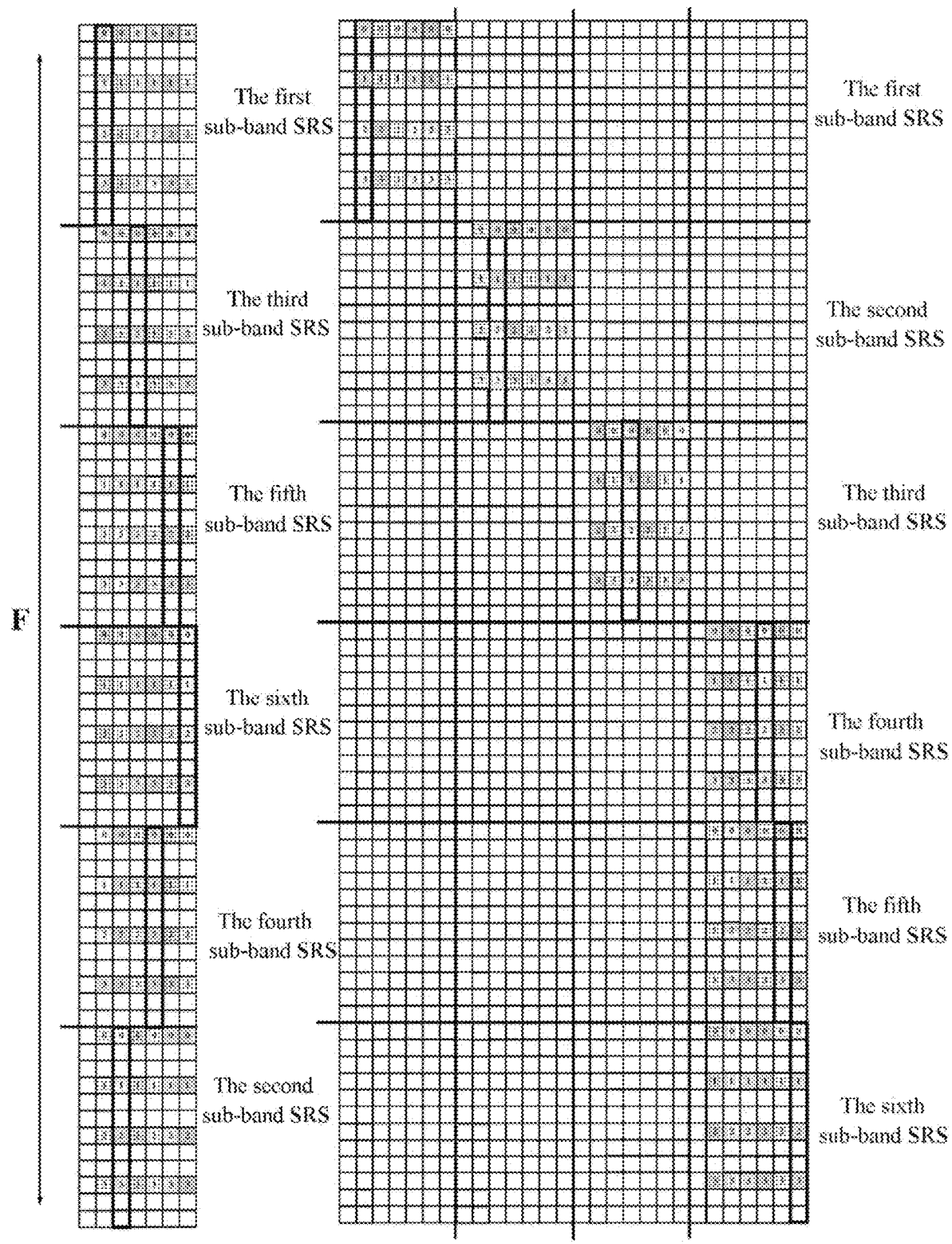
FIG. 4 is a schematic diagram showing an example of the frequency hopping manner according to an embodiment of the present disclosure.

A detailed description is provided below with reference to FIG. 4 in order to facilitate further understanding various frequency hopping manners supported by the technology of the present disclosure clearly. FIG. 4 is a schematic diagram showing an example of the frequency hopping manner according to an embodiment of the present disclosure.

Part (a) of FIG. 4 shows an example of intra-time slot frequency hopping. As shown in part (a) of FIG. 4, four RBs are crossed from the first sub-band SRS to the second sub-band SRS, three RBs are crossed from the second sub-band SRS to the third sub-band SRS, two RBs are crossed from the third sub-band SRS to the fourth sub-band SRS, one RB is crossed from the fourth sub-band SRS to the fifth sub-band SRS, and there is a continuous RB frequency hopping from the fifth sub-band SRS to the sixth sub-band SRS.

Part (b) of FIG. 4 shows a mixed example of the intra-time slot frequency hopping and the inter-time slot frequency hopping. For the sake of clearness, part (b) of FIG. 4 only depicts an example of the frequency hopping manner for the first group of SRS resources (circled in a bold solid line). Moreover, the frequency hopping manner for the second to the sixth groups of SRS resources is the same as the frequency hopping manner for the first group of SRS resources. As shown in part (b) of FIG. 4, the frequency hopping from the first sub-band SRS to the second sub-band SRS, from the second sub-band SRS to the third sub-band SRS, and from the third sub-band SRS to the fourth sub-band SRS is the inter-time slot frequency hopping, and the frequency hopping from the fourth sub-band SRS to the fifth sub-band SRS and from the fifth sub-band SRS to the sixth sub-band SRS is the intro-time slot frequency hopping.

It should be noted that, although FIG. 4, as an example, shows different frequency hopping manners including continuous RB frequency hopping and cross-RB frequency hopping as well as intra-time slot frequency hopping and inter-time slot frequency hopping, this is only an example rather than a limitation. The present disclosure does not limit specific frequency hopping manners. According to the principle of the present disclosure in combination with the practical application, those skilled in the art can design various frequency hopping patterns. For example, for the SRS mapping structure shown in (a) of FIG. 4, if all frequency hopping patterns are enumerated exhaustively, $A_6^6=1*2*3*4*5*6=720$ frequency hopping manners may be included, which are not listed herein.

In addition, it should be further noted that, although the present disclosure does not limit specific frequency hopping manners, preferably, the frequency band difference between frequency bands for two times of adjacent frequency hopping may be as large as possible. That is, the number of RBs crossed by two times of adjacent frequency hopping is as large as possible so as to reduce the interference among the user equipments.

(1-2-5. Other SRS Resource Settings)

Figure 5:
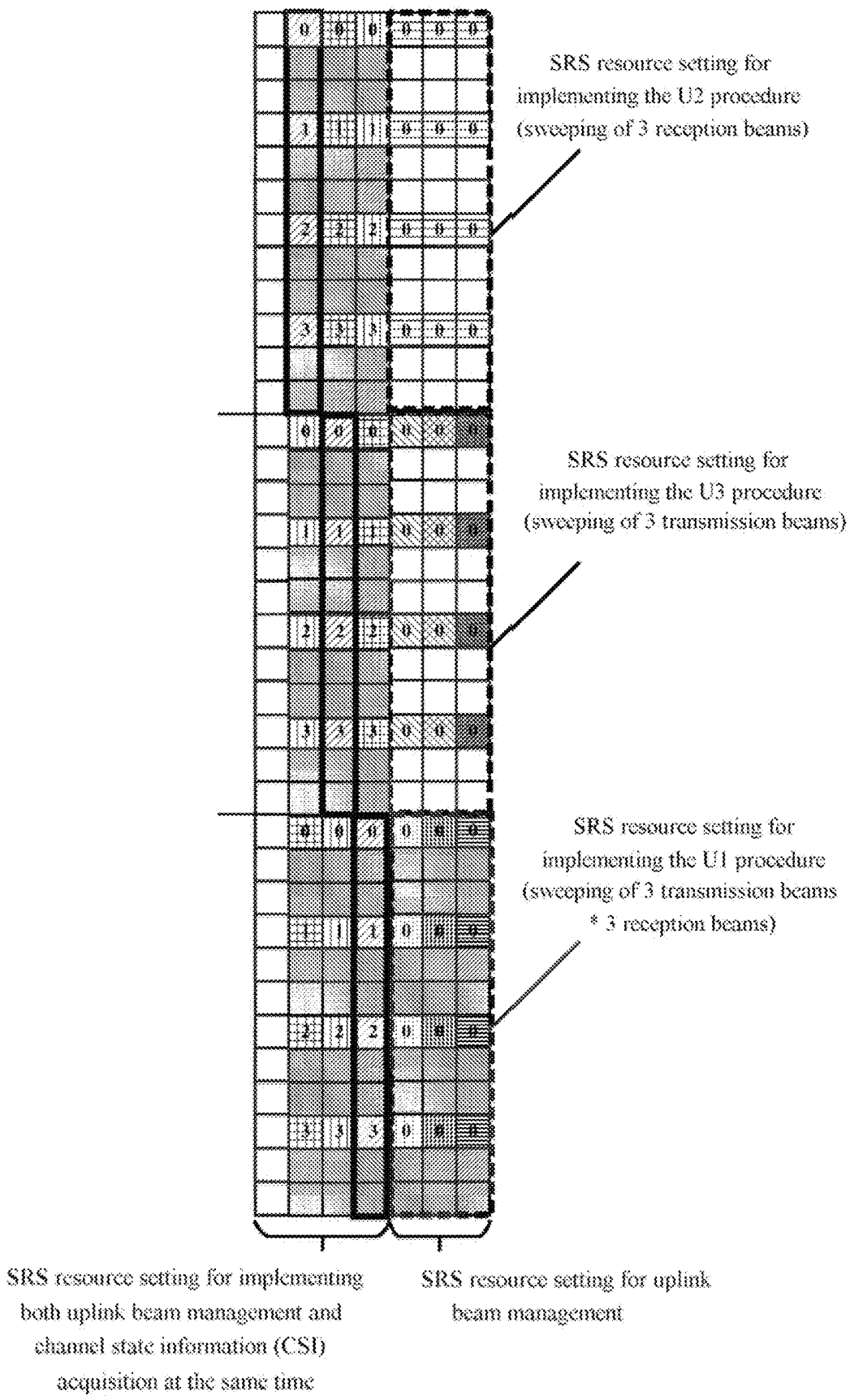
FIG. 5 is a schematic diagram showing an example of the SRS mapping structure including different SRS resource settings according to an embodiment of the present disclosure.

In the examples shown in above FIG. 2 to FIG. 4, it is assumed that the examples of the SRS resource setting for realizing uplink beam management and CSI acquisition at the same time occupy all the OFDM symbols in one time slot. However, in practical applications, it is possible that the SRS resource setting does not occupy all the OFDM symbols (for example, only occupying the second to the fourth OFDM symbols). Therefore, in order to further improve the resource utilization ratio, in addition to the above SRS resource setting, the SRS mapping structure according to an embodiment of the present disclosure may further include one or more other SRS resource settings. A detailed description of an example of a configuration of the SRS mapping structure in this case is provided below with reference to FIG. 5. FIG. 5 is a schematic diagram showing an example of an SRS mapping structure including different SRS resource settings according to an embodiment of the present disclosure.

As shown in FIG. 5, in the SRS mapping structure, the SRS resource settings corresponding to the second to the fourth OFDM symbols are substantially the same as the aforementioned SRS resource setting for realizing uplink beam management and CSI acquisition at the same time, which are not repeated herein. The fifth to the seventh OFDM symbols include examples of SRS resource settings for realizing the U2 procedure, the U3 procedure, and the U1 procedure, respectively.

As shown in FIG. 5, the SRS resource setting corresponding to the fifth to the seventh OFDM symbols in the first RB constitutes an SRS resource functional block (shown in a dashed line frame) for realizing the U2 procedure, and the SRS resource functional block can realize sweeping of three reception beams in a time domain, and it is not required to apply the IFDMA model in the functional block. The SRS resource setting corresponding to the fifth to the seventh OFDM symbols in the second RB constitutes an SRS resource functional block (shown in a dashed line frame) for realizing the U3 procedure, and the SRS resource functional block can realize sweeping to three transmission beams in a time domain, and it is also not required to apply the IFDMA model in the functional block. The SRS resource setting corresponding to the fifth to the seventh OFDM symbols in the third RB constitutes an SRS resource functional block (shown in a dashed line frame) for realizing the U1 procedure, and it is required for the functional block to apply an IFDMA model so as to realize sweeping of three transmission beams in a time domain and realize sweeping of three reception beams in a frequency domain at the same time.

As can be seen, since the SRS resource setting only for beam management does not need multi-port measurement, the number of ports of each group of SRS resources in an SRS resource setting for uplink beam management can be 1, such as port 0 in FIG. 5.

Furthermore, it should be understood that, although not shown in Figure S, the SRS mapping structure may further include the SRS resource setting only for realizing CSI acquisition. The number of ports of each group of SRS resources in this SRS resource setting corresponds to the number of antenna ports of the user equipment, and wideband measurement is implemented based on a predetermined frequency hopping manner, which is jo not repeated herein.

As can be seen, the SRS mapping structure shown in FIG. 5 includes multiple SRS resource settings so as to be flexibly adapted to requirements in various situations and make full use of uplink transmission resources. However, generally, since it is required for the user equipment to perform uplink beam management and CSI acquisition periodically when uplink transmission is performed, the SRS resource setting capable of realizing beam management and CSI acquisition at the same time according to an embodiment of the present disclosure has a general applicability.

(1-2-6. Notification of an SRS Mapping Structure)

The position of the OFDM symbol occupied by an SRS may be indicated in a form of vector. Specifically, for example, if each time slot includes seven OFDM symbols (or, it may include 14 OFDM symbols), a 7-bit vector x can be defined. If any of the resource elements in one OFDM symbol is occupied by an SRS resource, the bit corresponding to the OFDM symbol is represented as P; otherwise, the bit corresponding to the OFDM symbol is represented as 0. Taking part (a) of FIG. 2 as an example, the first OFDM symbol is generally used for a control channel, and cannot be occupied by an SRS resource, and the second to seventh OFDM symbols each are occupied by the SRS resource. The vector x corresponding to the SRS resource setting can be represented as {0111111}.

Alternatively, as described above, since the SRS resources included in each SRS setting in an SRS mapping structure generally continuously occupy OFDM symbols, the position of the OFDM symbols occupied by SRS resources in one time slot can be notified by indicating the position of the starting SRS resource (such as the occupied starting OFDM symbol number) and the total number of the occupied OFDM symbols of each SRS resource setting.

An appropriate notification manner can be selected based on a specific SRS mapping structure so as to save signaling overhead. For example, in the case that an SRS mapping structure includes only one SRS resource setting, the signaling overhead of the second notification manner (that is, the position of the starting SRS resource+the number of occupied OFDM symbols) may be small, and the second notification manner may be preferably used. On the other hand, in the case that an SRS mapping structure includes multiple SRS resource settings, it is possible that the signaling overhead of the first notification manner (that is, using the vector x) is smaller. Thus, in this case, the first notification manner can be preferably used.

Preferably, in order to further improve the uplink resource utilization ratio, the configuration unit 102 may be further configured based on practical situations such that the OFDM symbol occupied by the SRS resource is multiplexed with the OFDM symbol occupied by at least one of Physical Random Access Channel (PRACH), Physical Uplink Control Channel (PUCCH), Demodulation Reference Signal (DMRS) and Physical Uplink Shared Channel (PUSCH). Moreover, in the case that the configuration allows to perform multiplexing, the SRS resource is set with a low priority so as to discard the transmitted SRS in a case that there is contradiction or transmission of an SRS affects transmission of other signals on the multiplexed OFDM symbol. This is to ensure the transmission of other signals with a high priority.

For example, a 4-bit vector c can be defined to notify to the user equipment whether to allow multiplexing of the above four cases. The case for which multiplexing is allowed is represented as 1, and the case for which multiplexing is prohibited is represented as 0. As an example, it is assumed that a base station is configured to allow multiplexing with PRACH, to prohibit multiplexing with PUCCH, to allow multiplexing with DMRS, and to allow multiplexing with PUSCH, and vector c can be represented as {1011}. Thereby, the notification unit 104 can notify vector c to the user equipment. The user equipment can transmit, after receiving the notification regarding the multiplexing, the SRS by performing multiplexing with other signals.

On the other hand, in a case that there is contradiction and the base station discards the SRS with which contradiction occurs, the notification unit 104 notifies to the user equipment (for example, signaling SRS_Multiplexing_False can be designed) so as to inform the user equipment that the transmitted SRS is discarded and needs to be re-transmitted.

As a preferred embodiment, for the above notification content, signaling SRS_OFDM_Symbol_Location can be designed so as to notify information including the position of the OFDM symbol occupied by an SRS, indication regarding the situation of multiplexing, the position of the OFDM symbol that performs multiplexing or the like to the user equipment.

On the other hand, since an SRS mapping structure is generally constructed with a sub-carrier or a RB as the unit, preferably, the notification unit 104 can notify the SRS mapping structure in a form of bitmap. The bitmap can be generated, for example, in the following manners: for each sub-carrier, the RE occupied by an SRS resource is represented as 1, and the RE which is not occupied by an SRS resource is represented as 0. Thereby, each sub-carrier can correspond to one vector b of 7 bits (or 14 bits).

The notification unit 104 may notify, to the user equipment, the bitmap corresponding to the SRS mapping structure by, for example, RRC signaling, DCI, or the combination thereof. It is known that RRC signaling has a long notification period and can carry a lot of content; DCI has a short notification period and has a high real-time performance. DCI carries limited content due to shortage of physical-layer resources. Thus, in the case that notification is actually performed, an appropriate selection can be made based on the practical situation (for example, the scale of the SRS mapping structure, requirement of real-time performance, and the like), which is not limited in the present disclosure.

It can be understood that, the above SRS mapping structure including the SRS resource setting that can realize uplink beam management and CSI acquisition at the same time can reduce the system delay and improve the uplink resource utilization ratio, but it involves a problem of increasing the system overhead. On the other hand, the independent SRS mapping structures, which realize the beam management function and the CSI acquisition function, respectively, increase the system delay, but can reduce the system overhead. Thus, in practical applications, an SRS mapping structure can be configured based on different conditions and requirements.

As an example, the configuration of an SRS mapping structure can be determined based on the number of antenna ports of the user equipment. For example, if the number of antenna ports of the user equipment is lower than a predetermined threshold, the SRS mapping structure that can realize uplink beam management and CSI acquisition at the same time according to an embodiment of the present disclosure can be configured. That is, the smaller the number of antenna ports of the user equipment is, the more suitable it is to configure this SRS mapping structure. On the contrary, if the number of antenna ports of the user equipment is excessively large (that is, higher than a predetermined threshold), the SRS mapping structures (also known as independent SRS mapping structures) that realize uplink beam management and CST acquisition, respectively, can be configured.

On the other hand, as described above, the SRS mapping structure according to an embodiment of the present disclosure can improve the uplink resource utilization ratio. Thus, the uplink resource utilization ratio of the user equipment can be periodically monitored. Moreover, in a case that the uplink resource utilization ratio is lower than a predetermined threshold, the SRS mapping structure which can realize uplink beam management and CSI acquisition at the same time is configured for the user equipment. That is, the lower the uplink resource utilization ratio is, the more suitable it is to configure this SRS mapping structure.

It can be understood that, the larger the predetermined threshold for the number of antenna ports and the predetermined threshold for the uplink resource utilization ratio are set, the more it is beneficial for the SRS mapping structure configuration according to the present disclosure. Those skilled in the art can appropriately set the predetermined threshold(s) based on practical requirements, which is not specifically limited in the present disclosure.

According to the above embodiments of the present disclosure, an SRS mapping structure which can realize uplink beam management and CSI acquisition at the same time is designed, and the relevant parameter configuration and notification manner of the SRS mapping structure are described. An SRS mapping structure designed in this way can reduce the system delay and improve the uplink resource utilization ratio. In addition, it is further provided with determination conditions for dynamically configuring the SRS mapping structure so as to consider both the system delay and the system overhead. Thereby, the required SRS mapping structure can be configured reasonably based on practical requirements.

It should be noted that, the above device 100 can be realized at a chip level, or can also be realized at a device level by including other external components. For example, the device 100 may further include a communication unit (optionally, shown in a dashed line frame) configured to perform communication operations. For example, the communication unit can be configured to notify the configured SRS mapping structure, the discarding of the SRS with which contradiction occurs, or the like to the user equipment, and receive an SRS resource configuration request, a sub-band bandwidth configuration request, SRS or the like from the user equipment.

(2. Example of a Configuration on a User Equipment Side)

Figure 6:
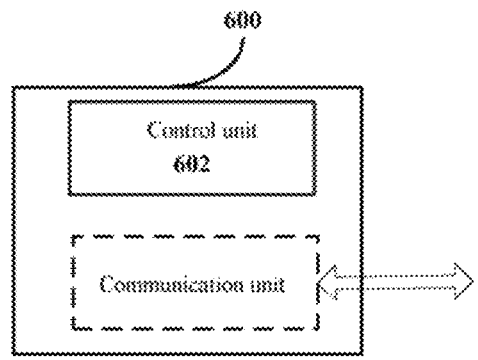
FIG. 6 is a block diagram showing an example of a functional configuration of a device on a user equipment side in a wireless communication system according to an embodiment of the present disclosure.

Corresponding to the above example of a configuration of the device on the base station side, an example of a functional configuration of the device on the user equipment side according to an embodiment of the present disclosure is described below with reference to FIG. 6. FIG. 6 is a block diagram showing an example of a functional configuration of a device on a user equipment side in a wireless communication system according to an embodiment of the present disclosure.

As shown in FIG. 6, a device 600 according to the embodiment includes a control unit 602.

The control unit 602 can be configured to control, according to an SRS mapping structure notified by a base station, a user equipment to transmit an SRS to the base station on corresponding time-frequency resources. The SRS mapping structure includes at least SRS resource setting for realizing both uplink beam management and CSI acquisition at the same time. For a specific example of a configuration of the SRS mapping structure, one may refer to the corresponding description above, which is not repeated herein.

Preferably, the control unit 602 can be further configured to control, for the above U1 procedure and U3 procedure, the user equipment to utilize different transmission beams to be swept to sequentially transmit the SRS to the base station so as to realize transmission beam sweeping, and to control, for the above U2 procedure, the user equipment to utilize the same transmission beam to sequentially transmit the SRS to the base station so as to realize reception beam sweeping.

Preferably, the control unit 602 may be further configured to control, according to an indication (for example, the above defined vector c may be included in the signaling SRS_OFDM_Symbol_Location on the base station side) regarding the multiplexing situation notified by the base station, the user equipment to transmit the SRS to the base station by multiplexing it with other signals. In addition, the control unit 602 may control, in a case that a notification that SRS transmitted in the multiplexing is discarded due to contradiction is received from the base station, the user equipment to perform retransmission for the discarded SRS. Furthermore, preferably, in order to avoid a waste of the transmission power, the control unit 602 may be further configured to allocate, transmission power originally allocated to the discarded SRS to other signals which have been multiplexed with the discarded SRS, by using a power boosting technology.

Preferably, the control unit 602 may be further configured to include a sub-band bandwidth configuration request of the user equipment in a dedicated signaling (for example, the above SRS_Subband_Request) or an uplink scheduling request (SR) to be transmitted to a base station, for the base station to determine a sub-band SRS bandwidth.

In addition, preferably, the control unit 602 may further generate an SRS resource configuration request (such as SRS_Resource_Request) of the user equipment to request the base station to configure the required number of SRS resources for the user equipment.

It can be understood that, the above device 600 can be realized at a chip level, or can also be realized at a device level by including other external components. For example, the device 600 may further include a communication unit (optionally, shown in a dashed line frame) configured to perform communication operations. For example, the communication unit can be configured to receive the SRS mapping structure and other relevant parameter settings notified by the base station, and to transmit an SRS resource configuration request, a sub-band bandwidth configuration request, SRS or the like to the base station.

It should be noted that, the embodiment of the device 600 on the user equipment side described herein corresponds to the embodiment of the device 100 on the base station side. Thus, for the content that is not described in detail in this embodiment, one may refer to the corresponding description above, which is not repeated herein.

It should be noted that, each of the functional units described above with reference to FIG. 2 and FIG. 6 is only a logical module divided according to the specific functions of each of the functional units, and is not intended to limit the specific implementations. In the practical implementation, the above functional units and modules may be implemented as separated physical entities, or may be implemented by a single entity (for example, a processor (CPU, DSP or the like), an integrated circuit or the like).

In addition, it should be noted that, although the device embodiments of the present disclosure have been described above with reference to block diagrams shown in FIG. 2 and FIG. 6, these are only examples rather than limitations. Those skilled in the art may modify the shown functional configuration examples according to the principle of the present disclosure. For example, functional modules in various embodiments may be added, deleted, modified, combined or the like, and all of such variations are considered to fall within the scope of the present disclosure.

[3. Signaling Design and Interaction Process According to an Embodiment of the Present Disclosure]

To further facilitate an understanding of the principle of the present disclosure, a signaling design and an interaction process for implementing the techniques of the present disclosure is described below with reference to the flowcharts shown in FIGS. 7A and 7B.

Figure 7A:
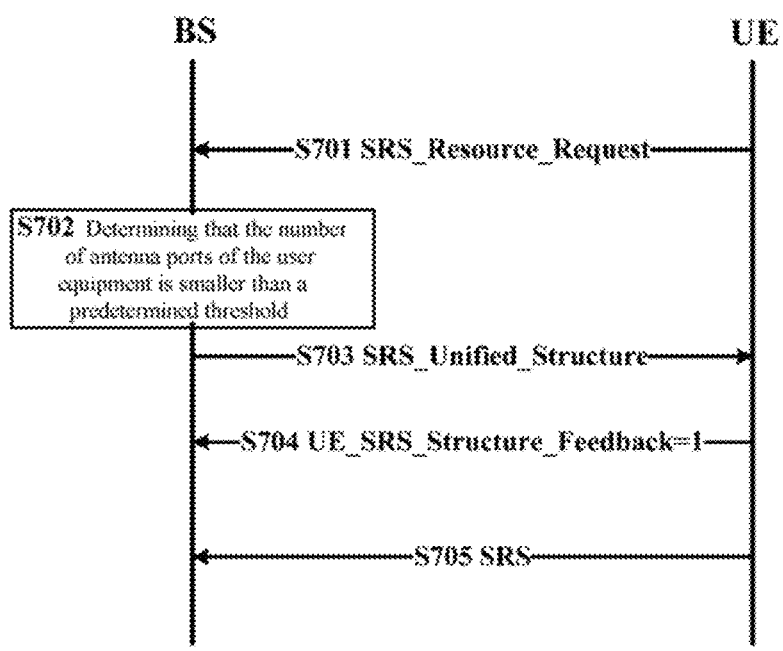
FIG. 7A is a flowchart showing a first example of a signaling interaction process in a wireless communication system according to an embodiment of the present disclosure.

FIG. 7A is a flowchart showing a first example of a signaling interaction process according to an embodiment of the present disclosure.

As shown in FIG. 7A firstly, in step S701, the user equipment transmits an SRS resource configuration request (for example, SRS_Resource_Request) to a base station for requesting the base station to configure an SRS resource for the user equipment. Then, in step S702, the base station determines, in response to the request from the user equipment, whether the number of antenna ports of the user equipment is smaller than a predetermined threshold, and configures an SRS mapping structure which can realize uplink beam management and CSI acquisition at the same time for the user equipment in the above manner in a case that the number of the antenna ports is determined to be smaller than the predetermined threshold. Next, in step S703, the base station notifies the determined SRS mapping structure to the user equipment by, for example, the signaling SRS_Unified_Structure shown in the FIG. 7. The signaling SRS_Unified_Structure may include a series of configuration information including specific SRS resources, port mapping, offsets, sampling factors or the like. In step S704, the user equipment may provide a feedback (for example, the signaling UE_SRS_Structure_Feedback shown in the figure) to the base station so as to indicate whether the user equipment successively receives the configured SRS mapping structure. For example, if UE_SRS_Structure_Feedback=1 is provided as a feedback, it represents that the user equipment successively receives the configuration; otherwise, it represents that the user equipment fails to receive the configuration. In a case of the successful reception, in step S705, the user equipment transmits, based on the received SRS mapping structure, an SRS to the base station on corresponding time-frequency resources.

Figure 7B:
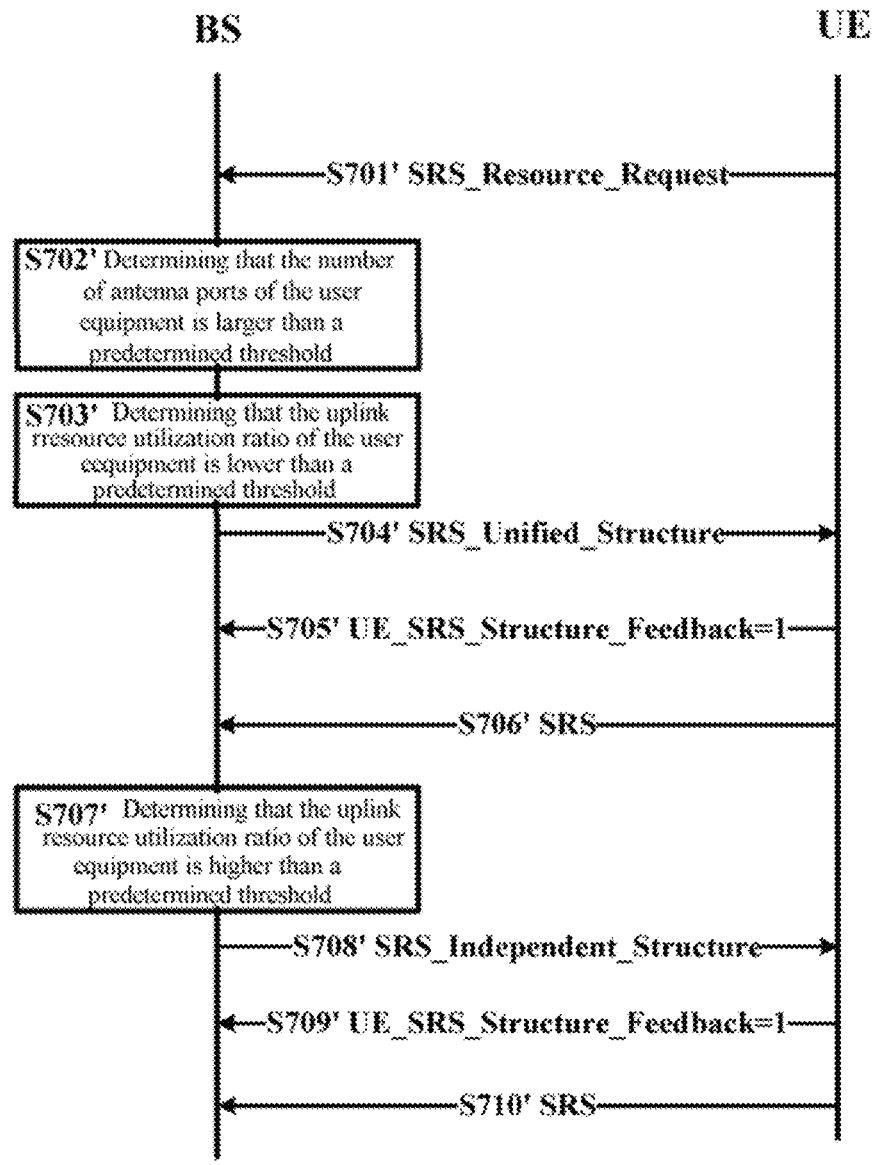
FIG. 7B is a flowchart showing a second example of a signaling interaction process in a wireless communication system according to an embodiment of the present disclosure.

FIG. 7B is a flowchart showing a second example of a signaling interaction process according to an embodiment of the present disclosure.

The flowchart shown in FIG. 7B is generally the same as the flowchart shown in FIG. 7A. The difference lies in that, in step S702', the base station determines that the number of antenna ports of the user equipment is larger than the predetermined threshold, and thereby continues to determine, in step S703', whether the uplink resource utilization ratio of the user equipment is lower than a predetermined threshold. Moreover, in a case that the uplink resource utilization ratio is determined to be lower than the predetermined threshold, the base station configures an SRS mapping structure which can realize uplink beam management and CSI acquisition at the same time for the user equipment, and notifies the configured SRS mapping structure (SRS Unified Structure) to the user equipment in step S704'.

In addition, since the number of antenna ports of the user equipment is generally fixed and the uplink resource utilization ratio changes dynamically, in subsequent operations, the base station needs to periodically monitor the uplink resource utilization ratio of the user equipment. Moreover, in a case that the uplink resource utilization ratio is determined to be larger than the predetermined threshold (step S707), the base station configures independent SRS mapping structures which realize uplink beam management and CSI acquisition, respectively, for the user equipment, and notifies the configured independent SRS mapping structures (for example, the signaling SRS_Independent_Structure) to the user equipment in step S708'. Afterwards, the user equipment performs the similar feedback operation in step S709', and transmits in step S710', based on the received SRS mapping structure, an SRS to the base station on corresponding time-frequency resources in a case of the successful reception of the configuration.

It can be understood that, in determining what kind of SRS mapping structure is configured for the user equipment, if either condition is satisfied, i.e., if the number of antenna ports is lower than a predetermined threshold or the uplink resource utilization ratio is lower than a predetermined threshold, then an SRS mapping structure (that is, the so-called unified SRS mapping structure) which can realize uplink beam management and CSI acquisition at the same time is configured for the user equipment; otherwise, SRS mapping structures (that is, the so-called independent SRS structures) which respectively realize the above two functions are configured for the user equipment.

It should be noted that, the signaling interaction processes shown in FIG. 7A and FIG. 7B are only examples for explaining the principle of the present disclosure, and those skilled in the art may appropriately modify the same according to the principle of the present disclosure, and all such variations are considered to fall within the scope of the present disclosure. For example, in steps S701 and S701', the transmission of a sub-band bandwidth configuration request (SRS_Subband_Request) to a base station may replace the transmission of an SRS resource configuration request to a base station so as to indicate the sub-band bandwidth configuration expected by the user equipment to the base station. Moreover, the base station can provide a feedback (such as BS_SRS_Subband_Response) to the user equipment in response to the request so as to indicate whether the base station accepts the sub-band bandwidth configuration request of the user equipment. Alternatively, the two steps S701 and S701' may be omitted. The base station can configure the SRS mapping structure based on the resource utilization condition and relevant information of the user equipment (number of beams to be swept, number of antenna ports, or the like) regardless of resource requirements of the user equipment. As another example, as described above, in a case that there is contradiction in the multiplexing and thereby the SRS is discarded, the base station can notify the user equipment such that the user equipment performs retransmission for the discarded SRS.

In addition, it should be noted that although the steps are numbered in time sequence for convenience of description in FIGS. 7A and 7B, these numbers do not indicate the order in which the steps are performed. In fact, these steps may be performed in parallel, or in a changed order, and so on.

[4. Method in a Wireless Communication System According to an Embodiment of the Present Disclosure]

Corresponding to the above device embodiments, method embodiments according to the present disclosure are described below with reference to FIG. 8 and FIG. 9.

(4-1. Method on a Base Station Side)

Figure 8:
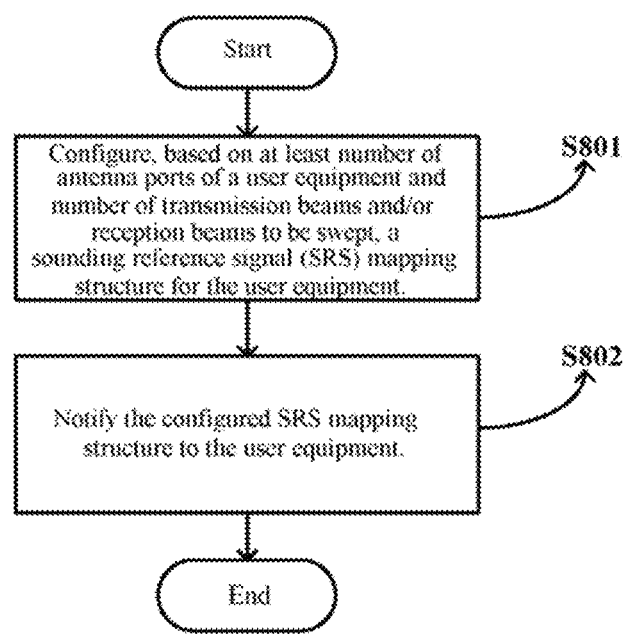
FIG. 8 is a flowchart showing a process example of a method on a base station side in a wireless communication system according to an embodiment of the present disclosure.

FIG. 8 is a flowchart showing a process example of a method on a base station side in a wireless communication system according to an embodiment of the present disclosure.

As shown in FIG. 8, the method 800 starts at step S801. In step S801, a sounding reference signal (SRS) mapping structure is configured, based on at least number of antenna ports of a user equipment and number of transmission beams and/or reception beams to be swept, for the user equipment. The SRS mapping structure includes at least SRS resource setting for implementing both uplink beam management and CSI acquisition at the same time. For the specific configuration of the SRS mapping structure, one may refer to the corresponding description above in device embodiments, which is not repeated herein.

Then, the method proceeds to step S802. In step S802, the configured SRS mapping structure is notified to the user equipment. For detailed notification manner and relevant parameter information to be notified, one may refer to the corresponding description above in device embodiments, which is not repeated herein.

(4-2. Method on a User Equipment Side)

Figure 9:
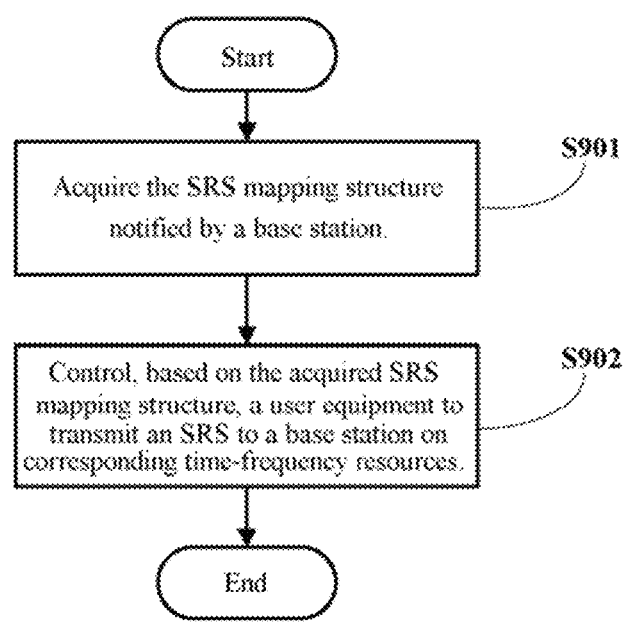
FIG. 9 is a flowchart showing a process example of a method on a user equipment side in a wireless communication system according to an embodiment of the present disclosure.

FIG. 9 is a flowchart showing a process example of a method on a user equipment side in a wireless communication system according to an embodiment of the present disclosure.

As shown in FIG. 9, the method 900 according to the embodiment starts at step S901. In step S901, the SRS mapping structure notified by the base station is acquired. The SRS mapping structure includes at least SRS resource setting which can realize uplink beam management and CSI acquisition at the same time.

Then, the method proceeds to step S902. In step S902, the user equipment is controlled to transmit an SRS to a base station on corresponding time-frequency resources based on the acquired SRS mapping structure.

It should be understood that the method embodiments described here with reference to FIG. 8 and FIG. 9 correspond to the device embodiments described above with reference to FIG. 1 and FIG. 6, respectively, and thus for the contents which are not described in detail herein, one may refer to the corresponding description above, which is not repeated herein.

It should be noted that, although the examples of the processes of the methods in the wireless communication system according to embodiments of the present disclosure have been described, these are only examples rather than limitations. Moreover, those skilled in the art may modify the above embodiments according to the principle in the present disclosure. For example, the steps in each of the embodiments may be added, deleted or combined, or the like, and all of such modifications fall within the scope of the present disclosure.

It should be understood that, machine-executable instructions in a storage medium and a program product according to the embodiments of the present disclosure may be configured to perform the method(s) corresponding to the above-described device embodiment(s). Therefore, for the contents which are not described in detail here, one may refer to the corresponding description above, which is not repeated herein.

Accordingly, a storage medium on which the above program product storing machine-executable instructions is carried is also included in the disclosure of the invention.

The storage medium includes but is not limited to a floppy disk, an optical disk, a magneto-optical disk, a storage card, a memory rod and the like.

[Computing Device for Implementing the Device and the Method of the Present Disclosure]

Figure 10:
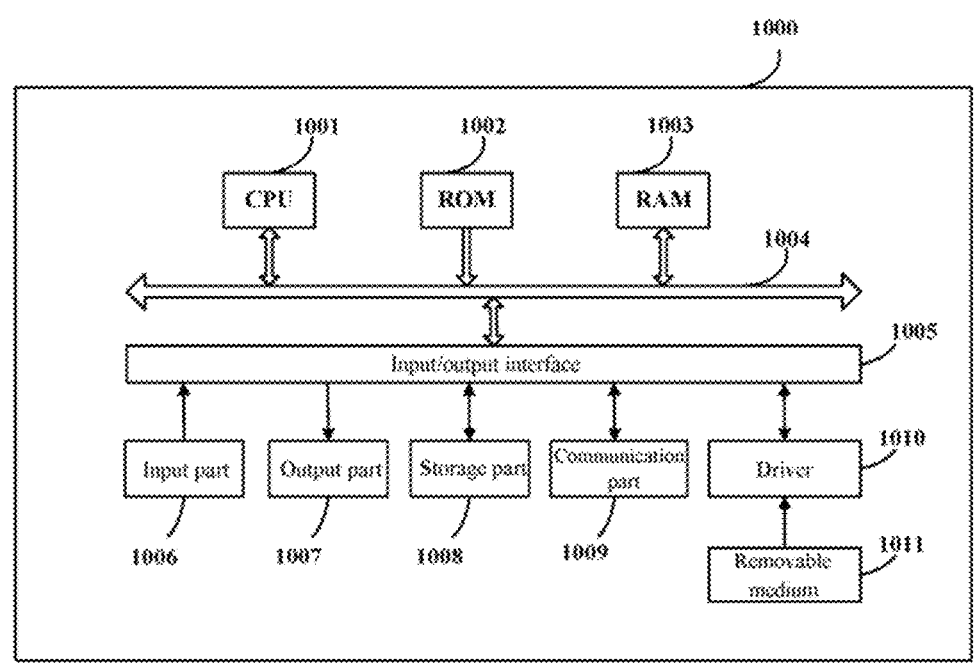
FIG. 10 is a block diagram showing an exemplary structure of a personal computer which may be used as an information processing device in an embodiment of the present disclosure.

In addition, it should be further noted that, the above described series of processing and devices may also be implemented by software and/or firmware. In the case of being implemented in software and/or firmware, a program constituting the software is installed from a storage medium or a network to a computer with a dedicated hardware structure, e.g., a general purpose personal computer 1000 shown in FIG. 10, which can perform various functions when various programs are installed thereon. FIG. 10 is a block diagram showing an exemplary structure of a personal computer which may be used as an information processing device in embodiments of the present disclosure.

In FIG. 10, a central processing unit (CPU) 1001 executes various processing according to the program stored in a read only memory (ROM) 1002 or the program loaded from the storage part 1008 to a random access memory (RAM) 1003. In the RAM 1003, the data required by CPU 1001 to execute various processing is also stored as needed.

The CPU 1001, the ROM 1002 and the RAM 1003 are connected with each other via a bus 1004. An input/output interface 1005 is also linked to the bus 1004.

The following components are linked to the input/output interface 1005: an input part 1006 including keyboard, mouse and the like: an output part 1007 including displays such as a cathode ray tube (CRT), a liquid crystal display (LCD), a loudspeaker and the like; a storage part 1008 including hard disc and the like; and a communication part 1009 including a network interface card such as a LAN card, modem and the like. The communication part 1009 performs communication processing via a network such as the Internet.

A driver 1010 may also be connected to the input/output interface 1005 as needed. A removable medium 1011, e.g., a magnetic disk, an optical disk, an magneto optical disk, a semiconductor memory or the like, can be installed on the drive 1010 as needed so that a computer program fetched therefrom can be installed into the storage part 1008 as needed.

In the case that the foregoing series of processes are performed in software, a program constituting the software is installed from a network, e.g., the Internet, or a storage medium, e.g., the removable medium 1011.

It should be understood by those skilled in the art that the memory medium is not limited to the removable medium 1011 shown in FIG. 10 in which the program is stored and which is distributed separately from the device so as to provide the program to the user. Examples of the removable medium 1011 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively, the storage medium may be a ROM 1002, a hard disk included in the storage part 1008 or the like, which has a program stored therein and is distributed to the user along with a device in which they are incorporated.

[6. Application Examples of the Technology of the Present Disclosure]

The technology in the present disclosure can be applied into various products. For example, the base station mentioned in the present disclosure may be implemented as gNodeB (gNB) and any type of evolution Node B (eNB), such as a macro eNB and a small eNB. The small eNB such as a pico eNB, micro eNB and a home (femto-cell) eNB may have a smaller coverage range than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

For example, a UE mentioned in the present disclosure may be realized as a mobile terminal (such as a smartphone, a tablet personal computer (PC), a notebook PC, a portable game terminal, a portable/dongle type mobile router, and a digital camera device), or an in-vehicle terminal (such as a car navigation device). The UE may also be realized as a terminal (that is also referred to as a machine type communication (MTC) terminal) that performs machine-to-machine (M2M) communication. Furthermore, the UE may be a wireless communication module (such as an integrated circuit module including a single die) mounted on each of the terminals.

Application examples according to the present disclosure are described below with reference to FIGS. 11 to 14.

(6-1. Application Examples of a Base Station)

First Application Example

Figure 11:
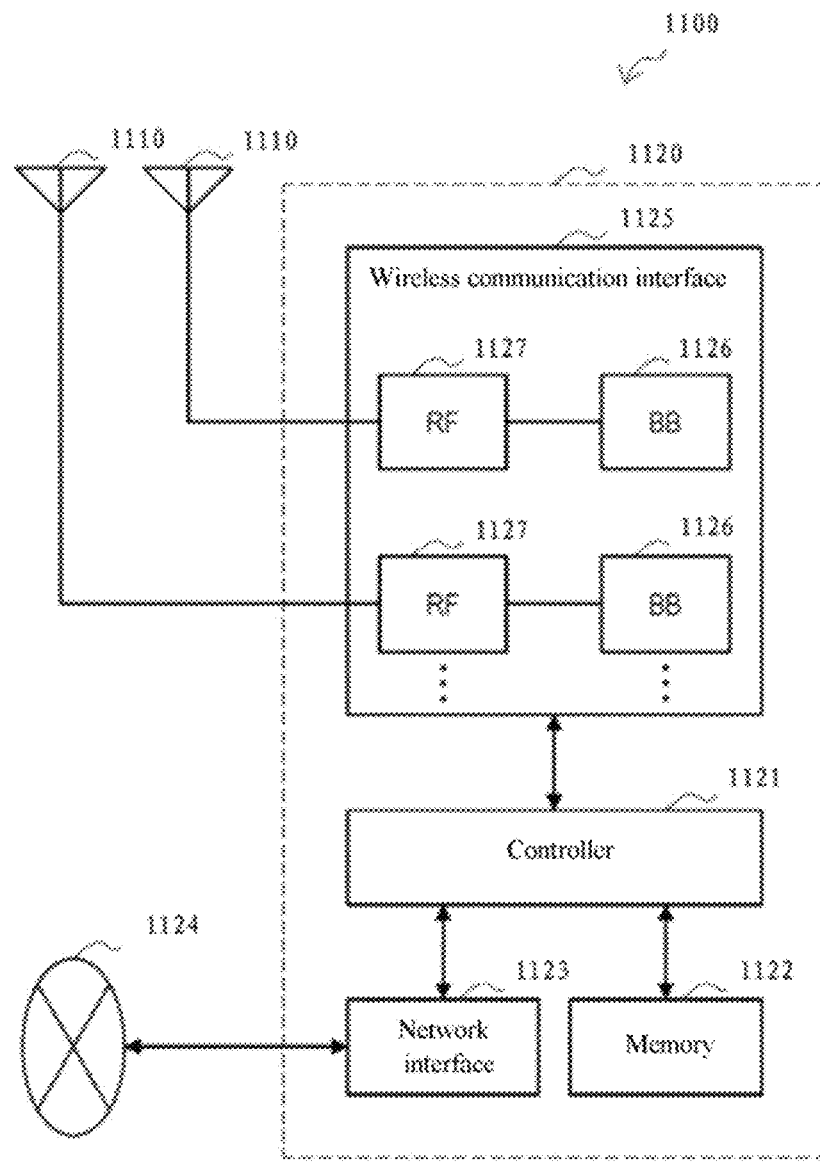
FIG. 11 is a block diagram showing a first example of a schematic configuration of an evolved node (eNB) to which the technology of the present disclosure may be applied.

FIG. 11 is a block diagram showing a first example of a schematic configuration of an eNB to which the technology of the present disclosure may be applied. An eNB 1100 includes one or more antennas 1110 and a base station device 1120. The base station device 1120 and each of the antennas 1110 may be connected with each other via RF cable.

Each of the antennas 1110 includes one or more antenna elements (such as multiple antenna elements included in a multiple-input multiple-output (MIMO) antenna), and is used for transmitting and receiving a wireless signal by the base station device 1120. The eNB 1100 may include the multiple antennas 1110, as shown in FIG. 11. For example, multiple antennas 1110 may be compatible with multiple frequency bands used by the eNB 1100. Although FIG. 11 shows an example in which the eNB 1100 includes multiple antennas 1110, the eNB 1100 may also include a single antenna 1110.

The base station device 1120 includes a controller 1121, a memory 1122, a network interface 1123, and a wireless communication interface 1125.

The controller 1121 may be a CPU or a DSP and operate various functions of higher layers of the base station device 1120. For example, the controller 1121 generates a data packet based on data in a signal processed by the wireless communication interface 1125, and transfers the generated packet via a network interface 1123. The controller 1121 may bundle data from multiple baseband processors to generate bundled packet, and transfer the generated bundled packet. The controller 1121 may have logical functions to perform control such as wireless resource control, wireless bearer control, mobility management, admission control, and scheduling. The control may be performed in conjunction with an adjacent eNB or a core network node. The memory 1122 includes a RAM and a ROM, and stores a program that is executed by the controller 1121, and various types of control data (such as a terminal list, transmission power data, and scheduling data).

The network interface 1123 is a communication interface for connecting the base station device 1120 to a core network 1124. The controller 1121 may communicate with a core network node or another eNB via the network interface 1123. In that case, the eNB 1100, and the core network node or the other eNB may be connected to each other through a logical interface (such as an S1 interface and an X2 interface). The network interface 1123 may also be a wired communication interface or a wireless communication interface for radio backhaul. If the network interface 1123 is a wireless communication interface, it may use a higher frequency band for wireless communication than a frequency band used by the wireless communication interface 1125.

The wireless communication interface 1125 supports any cellular communication scheme (such as Long Term Evolution (LTE), LTE-advanced, and New Radio Access Technology (NR)), and provides wireless connection to a terminal located in a cell of the eNB 1100 via the antenna 1110. The wireless communication interface 1125 may typically include, for example, a baseband (BB) processor 1126 and an RF circuit 1127. The BB processor 1126 may perform, for example, coding/decoding, modulation/demodulation, and multiplexing/de-multiplexing, and perform various types of signal processing of the layers (for example LI, media access control (MAC), radio link control (RLC) and packet data convergence protocol (PDCP)). Instead of the controller 1121, the BB processor 1126 may have a part or all of the above-described logical functions. The BB processor 1126 may be a memory storing communication control programs or a module including a processor configured to execute programs and a related circuit. Updating programs may change functions of the BB processor 1126. The module may be a card or a blade that is inserted into a slot of the base station device 1120. Alternatively, the module may be a chip that is mounted on the card or the blade. Meanwhile, the RF circuit 1127 may include, for example, a frequency mixer, a filter or an amplifier, and transmits and receives a wireless signal via the antenna 1110.

As shown in FIG. 11, the wireless communication interface 1125 may include multiple BB processors 1126. For example, multiple BB processors 1126 may be compatible with multiple frequency bands used by the eNB 1100. As shown in FIG. 11, the wireless communication interface 1125 may include multiple RF circuits 1127. For example, the multiple RF circuits 1127 may be compatible with multiple antenna elements. Although an example in which the wireless communication interface 1125 includes multiple BB processors 1126 and multiple RF circuits 1127 is shown in FIG. 11, the wireless communication interface 1125 may also include a single BB processor 1126 or a single RF circuit 1127.

Second Application Example

Figure 12:
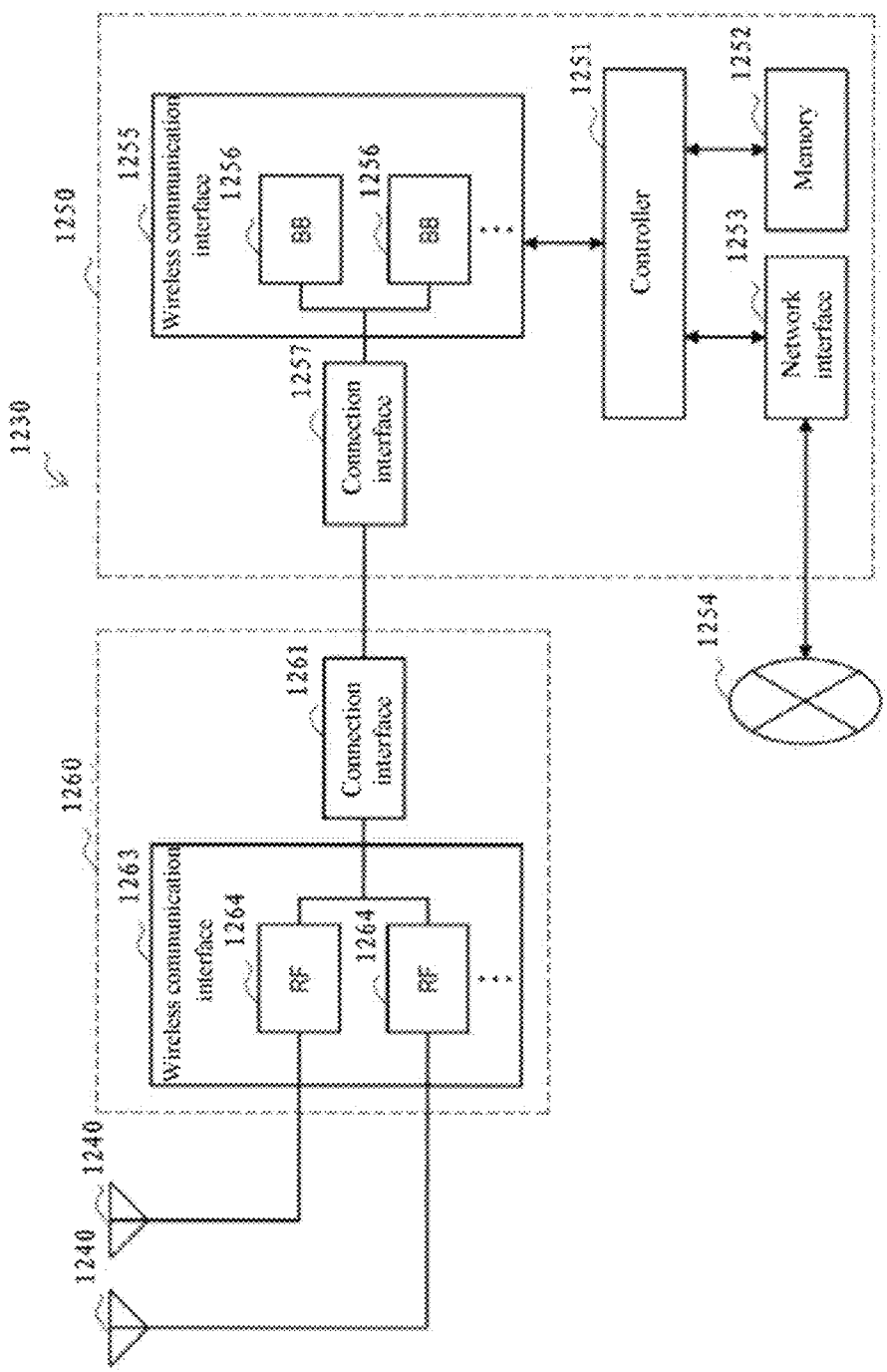
FIG. 12 is a block diagram showing a second example of a schematic configuration of the eNB to which the technology of the present disclosure may be applied.

FIG. 12 is a block diagram showing a second example of a schematic configuration of the eNB to which the technology of the present disclosure may be applied. An eNB 1230 includes one or more antennas 1240, a base station device 1250 and an RRH 1260. The RRH 1260 and each of antennas 1240 may be connected to each other via an RF cable. The base station device 1250 and the RRH 1260 may be connected to each other via a high-speed line such as a fiber cable.

Each of the antennas 1240 includes a single or multiple antenna elements (such as multiple antenna elements included in a MIMO antenna), and is used for transmitting and receiving a wireless signal by the RRH 1260. As shown in FIG. 12, the eNB 1230 may include multiple antennas 1240. For example, the multiple antennas 1240 may be compatible with multiple frequency bands used by the eNB 1230. Although an example in which the eNB 1230 including multiple antennas 1240 is shown in FIG. 12, the eNB 1230 may also include a single antenna 1240.

The base station device 1250 includes a controller 1251, a memory 1252, a network interface 1253, a wireless communication interface 1255, and a connection interface 1257. The controller 1251, the memory 1252, and the network interface 1253 are the same as the controller 1121, the memory 1122, and the network interface 1123 described with reference to FIG. 11.

The wireless communication interface 1255 supports any cellular communication solution (such as LTE, LTE-advanced, and NR), and provides wireless communication to a terminal located in a sector corresponding to the RRH 1260 via the RRH 1260 and the antenna 1240. The wireless communication interface 1255 may generally include, for example, a BB processor 1256. Other than connecting to an RF circuit 1264 of the RRH 1260 via the connection interface 1257, the BB processor 1256 is the same as the BB processor 1126 described with reference to FIG. 11. As shown in FIG. 12, the wireless communication interface 1255 may include multiple BB processors 1256. For example, the multiple BB processors 1256 may be compatible with the multiple frequency bands used by the eNB 1230. Although FIG. 12 shows an example in which the wireless communication interface 1255 includes multiple BB processors 1256, the wireless communication interface 1255 may also include a single BB processor 1256.

The connection interface 1257 is an interface for connecting the base station device 1250 (the wireless communication interface 1255) to the RRH 1260. The connection interface 1257 may also be a communication module for communication in the above-described high-speed line for connecting the base station device 1250 (the wireless communication interface 1255) to the RRH 1260.

The RRH 1260 includes a connection interface 1261 and a wireless communication interface 1263.

The connection interface 1261 is an interface for connecting the RRH 1260 (the wireless communication interface 1263) to the base station device 1250. The connection interface 1261 may also be a communication module for the communication in the above-described high-speed line.

The wireless communication interface 1263 transmits and receives a wireless signal via the antenna 1240. The wireless communication interface 1263 may generally include, for example, the RF circuit 1264. The RF circuit 1264 may include, for example, frequency mixer, a filter and an amplifier, and transmits and receives a wireless signal via the antenna 1240. The wireless communication interface 1263 may include multiple RF circuits 1264, as shown in FIG. 12. For example, the multiple RF circuits 1264 may support multiple antenna elements. Although FIG. 12 shows an example in which the wireless communication interface 1263 includes multiple RF circuits 1264, the wireless communication interface 1263 may also include a single RF circuit 1264.

In the eNB 1100 and the eNB 1230 shown in FIG. 11 and FIG. 12, the communication unit in the above-described device 100 may be implemented by the wireless communication interface 1125 and the wireless communication interface 1255 and/or the wireless communication interface 1263. At least part of the functions of the configuration unit 102, the determination unit 106, and the control unit 108 in the device 100 may also be implemented by the controller 1121 and the controller 1251.

(6-2. Application Examples of the User Equipment)

First Application Example

Figure 13:
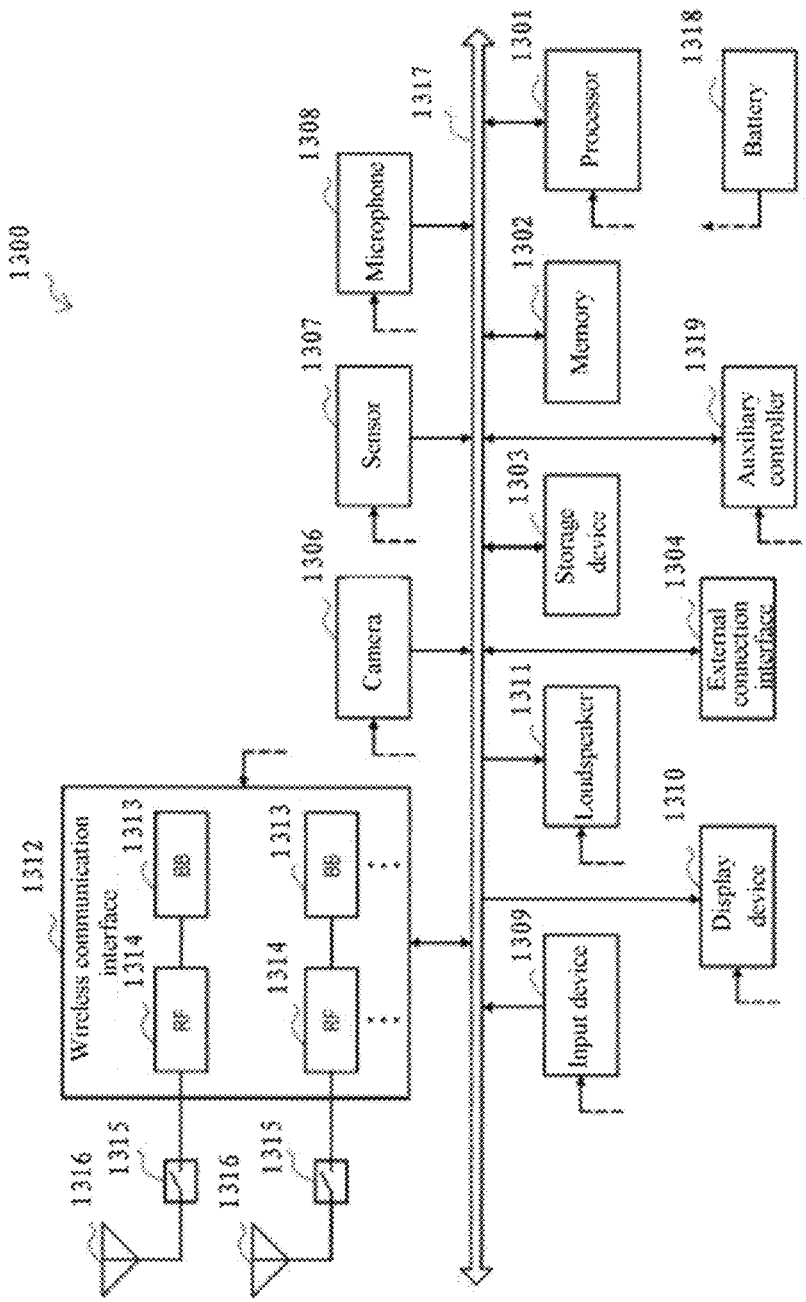
FIG. 13 is a block diagram showing an example of a schematic configuration of a smartphone to which the technology of the present disclosure may be applied.

FIG. 13 is a block diagram showing an example of a schematic configuration of a smartphone 1300 to which the technology of the present disclosure may be applied. The smartphone 1300 includes a processor 1301, a memory 1302, a storage device 1303, an external connection interface 1304, a camera 1306, a sensor 1307, a microphone 1308, an input device 1309, a display device 1310, a loudspeaker 1311, a wireless communication interface 1312, one or more antenna switches 1315, one or more antennas 1316, a bus 1317, a battery 1318 and an auxiliary controller 1319.

The processor 1301 may be, for example, a CPU or a system on chip (SoC), and controls the functions of an application layer and another layer of the smartphone 1300. The memory 1302 includes a RAM and a ROM, and stores data and a program that is executed by the processor 1301. The storage device 1303 may include a storage medium such as a semiconductor memory and a hard disk. The external connection interface 1304 is an interface for connecting an external device (such as a memory card and a universal serial bus (USB) device) to the smartphone 1300.

The camera 1306 includes an image sensor (such as a charge coupled device (CCD) and a complementary metal oxide semiconductor (CMOS)), and generates a captured image. The sensor 1307 may include a group of sensors such as a measurement sensor, a gyro sensor, a geomagnetic sensor, and an acceleration sensor. The microphone 1308 converts sounds that are inputted to the smartphone 1300 into audio signals. The input device 1309 includes, for example, a touch sensor configured to detect touch onto a screen of the display device 1310, a keypad, a keyboard, a button, or a switch, and receives an operation or information inputted from a user. The display device 1310 includes a screen (such as a liquid crystal display (LCD) and an organic light-emitting diode (OLED) display), and displays an output image of the smartphone 1300. The loudspeaker 1311 converts audio signals that are outputted from the smartphone 1300 to sounds.

The wireless communication interface 1312 supports any cellular communication scheme (such as LTE, LTE-advanced, and NR), and performs wireless communication. The wireless communication interface 1312 may generally include, for example, a BB processor 1313 and an RF circuit 1314. The BB processor 1313 may perform, for example, coding/decoding, modulation/demodulation and multiplexing/de-multiplexing, and perform various types of signal processing for wireless communication. Meanwhile, the RF circuit 1314 may include, for example, a frequency mixer, a filter and an amplifier, and transmits and receives a wireless signal via the antenna 1316. The wireless communication interface 1312 may be a chip module having the BB processor 1313 and the RF circuit 1314 integrated thereon. The wireless communication interface 1312 may include multiple BB processors 1313 and multiple RF circuits 1314, as shown in FIG. 13. Although FIG. 13 shows an example in which the wireless communication interface 1312 includes the multiple BB processors 1313 and the multiple RF circuits 1314, the wireless communication interface 1312 may also include a single BB processor 1313 or a single RF circuit 1314.

Moreover, in addition to a cellular communication scheme, the wireless communication interface 1312 may also support another type of wireless communication scheme such as a device to device (D2D) communication scheme, a short-distance wireless communication scheme, a near field communication scheme, and a wireless local area network (LAN) scheme. In this case, the wireless communication interface 1312 may include a BB processor 1313 and an RF circuit 1314 for each wireless communication scheme.

Each of the antenna switches 1315 switches connection destinations of the antennas 1316 among multiple circuits (such as circuits for different wireless communication schemes) included in the wireless communication interface 1312.

Each of the antennas 1316 includes a single or multiple antenna elements (such as multiple antenna elements included in a MIMO antenna), and is used for transmitting and receiving wireless signals by the wireless communication interface 1312. The smartphone 1300 may include the multiple antennas 1316, as shown in FIG. 13. Although FIG. 13 shows an example in which the smartphone 1300 includes the multiple antennas 1316, the smartphone 1300 may also include a single antenna 1316.

In addition, the smartphone 1300 may include an antenna 1316 for each wireless communication scheme. In this case, the antenna switch 1315 may be omitted from the configuration of the smart phone 1300.

The bus 1317 connects the processor 1301, the memory 1302, the storage device 1303, the external connection interface 1304, the camera 1306, the sensor 1307, the microphone 1308, the input device 1309, the display device 1310, the loudspeaker 1311, the wireless communication interface 1312, and the auxiliary controller 1319 to each other. The battery 1318 supplies power to each block of the smartphone 1300 shown in FIG. 13 via feeder lines which are partially shown as dashed lines in the FIG. 13. The auxiliary controller 1319 operates a minimum necessary function of the smartphone 1300, for example, in a sleep mode.

In the smartphone 1300 shown in FIG. 13, the communication unit in the above-described device 600 may be implemented by the wireless communication interface 1312. At least a part of the functions of the device 600 may also be implemented by the processor 1301 or the auxiliary controller 1319.

Second Application Example

Figure 14:
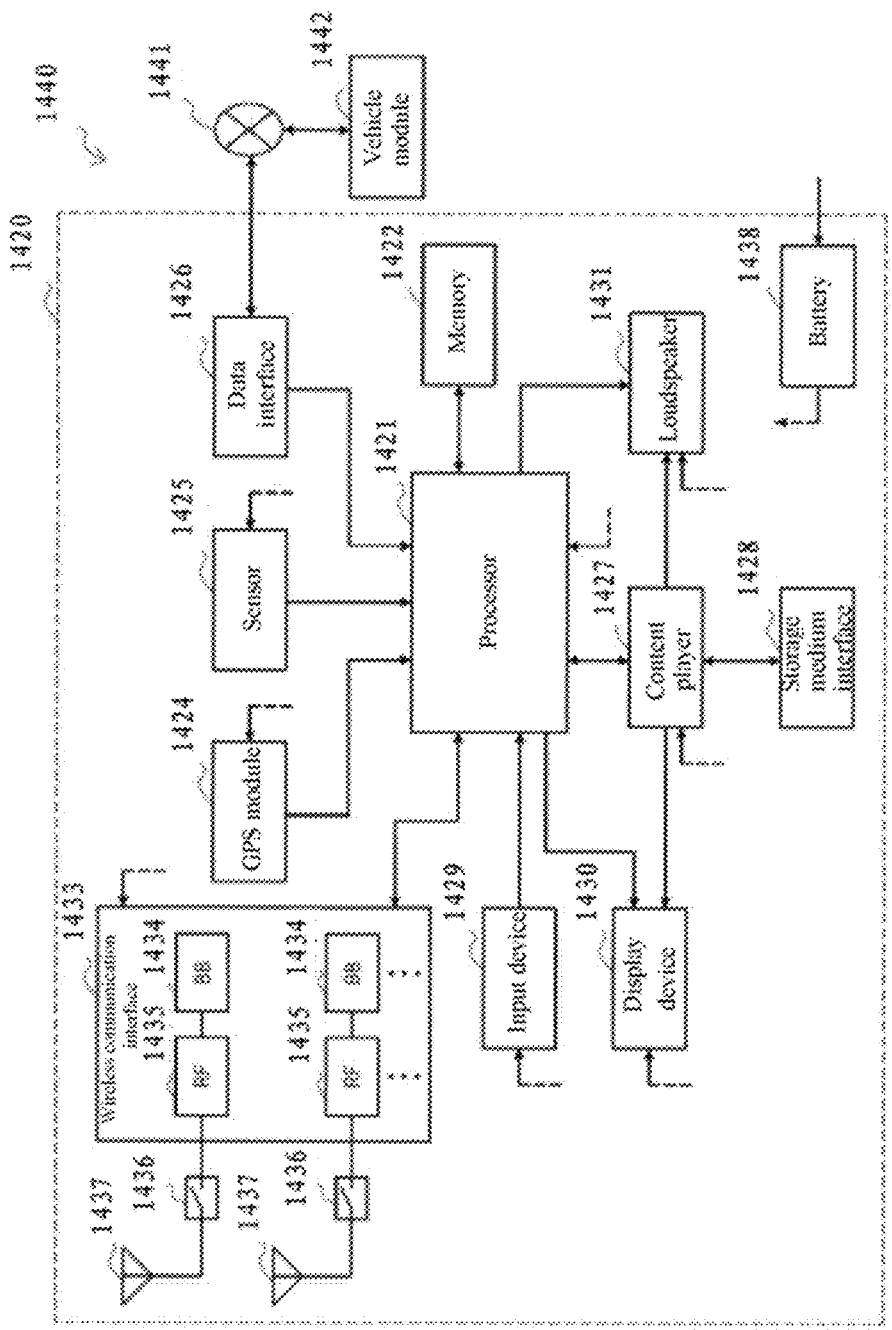
FIG. 14 is a block diagram showing an example of a schematic configuration of an automobile navigation device to which the technology of the present disclosure may be applied.

FIG. 14 is a block diagram showing an example of a schematic configuration of a car navigation device 1420 to which the technology of the present disclosure may be applied. The car navigation device 1420 includes a processor 1421, a memory 1422, a global positioning system (GPS) module 1424, a sensor 1425, a data interface 1426, a content player 1427, a storage medium interface 1428, an input device 1429, a display device 1430, a loudspeaker 1431, a wireless communication interface 1433, one or more antenna switches 1436, one or more antennas 1437, and a battery 1438.

The processor 1421 may be, for example, the CPU or the SoC, and control the navigation function and other functions of the car navigation device 1420. The memory 1422 includes a RAM and a ROM, and stores data and a program executed by the processor 1421.

The GPS module 1424 measures a position (such as latitude, longitude, and altitude) of the car navigation device 1420 by using GPS signals received from a GPS satellite. The sensor 1425 may include a group of sensors such as a gyroscope sensor, a geomagnetic sensor and an air pressure sensor. The data interface 1426 is connected to, for example, an in-vehicle network 1441 via a terminal that is not shown, and acquires data (such as vehicle speed data) generated by the vehicle.

The content player 1427 reproduces content stored in a storage medium (such as a CD and a DVD) that is inserted into the storage medium interface 1428. The input device 1429 includes, for example, a touch sensor configured to detect touch on a screen of the display device 1430, a button, or a switch, and receives an operation or information inputted from a user. The display device 1430 includes a screen such as an LCD or an OLED display, and displays an image of the navigation function or content that is reproduced. The loudspeaker 1431 outputs sounds of the navigation function or the content that is reproduced.

The wireless communication interface 1433 supports any cellular communication scheme (such as LTE, LTE-advanced, and NR), and performs wireless communication. The wireless communication interface 1433 may generally include, for example, a BB processor 1434 and an RF circuit 1435. The BB processor 1434 may perform, for example, coding/decoding, modulation/demodulation and multiplexing/de-multiplexing, and perform various types of signal processing for wireless communication. Meanwhile, the RF circuit 1435 may include, for example, a frequency mixer, a filter and an amplifier, and transmits and receives a wireless signal via the antenna 1437. The wireless communication interface 1433 may also be one chip module that has the BB processor 1434 and the RF circuit 1435 integrated thereon. The wireless communication interface 1433 may include multiple BB processors 1434 and multiple RF circuits 1435, as shown in FIG. 14. Although FIG. 14 shows an example in which the wireless communication interface 1433 includes the multiple BB processors 1434 and the multiple RF circuits 1435, the wireless communication interface 1433 may also include a single BB processor 1434 or a single RF circuit 1435.

Moreover, in addition to a cellular communication scheme, the wireless communication interface 1433 may also support other types of wireless communication scheme such as a device to device (D2D) communication scheme, a short-distance wireless communication scheme, a near field communication scheme, and a wireless LAN scheme. In this case, the wireless communication interface 1433 may include a BB processor 1434 and an RF circuit 1435 for each wireless communication scheme.

Each of the antenna switches 1436 switches connection destinations of the antenna 1437 among multiple circuits (such as circuits for different wireless communication schemes) included in the wireless communication interface 1433.

Each of the antennas 1437 includes a single antenna element or multiple antenna elements (such as multiple antenna elements included in the MIMO antenna), and is used for transmitting and receiving a wireless signal by the wireless communication interface 1433. The car navigation device 1420 may include multiple antennas 1437, as shown in FIG. 14. Although FIG. 14 shows an example in which the car navigation device 1420 includes multiple antennas 1437, the car navigation device 1420 may also include a single antenna 1437.

Furthermore, the car navigation device 1420 may include the antenna 1437 for each wireless communication scheme. In this case, the antenna switch 1436 may be omitted from the configuration of the vehicle navigation device 1420.

The battery 1438 supplies power to each block of the car navigation device 1420 shown in FIG. 14 via feeder lines which are partially shown by dashed lines in the figure. The battery 1438 accumulates the power supplied from the vehicle.

In the car navigation device 1420 shown in FIG. 14, the communication unit in the above device 600 may be implemented by the wireless communication interface 1433. At least part of the functions of the control unit 602 in the device 600 may also be implemented by the processor 1421.

The technology of the present disclosure may be implemented as a vehicle-mounted system (or a vehicle) 1440 including one or more blocks of the car navigation device 1420, the in-vehicle network 1441 and a vehicle module 1442. The vehicle module 1442 generates vehicle data (such as vehicle speed, engine speed and fault information), and outputs the generated data to the in-vehicle network 1441.

Preferred embodiments of the present disclosure have been described above with reference to the drawings, but the present disclosure is not limited to the above examples of course. Those skilled in the art can make various changes and modifications within the scope of the appended claims, and it should be understood that such changes and modifications naturally fall within the technical scope of the present disclosure.

For example, multiple functions of one unit in the above embodiments may be realized by separate devices. Alternatively, multiple functions realized by multiple units in the above embodiments may be implemented by separated devices, respectively. Furthermore, one of the above functions may be realized by multiple units. Needless to say, such configuration is included in the technical scope of the present disclosure.

In the specification, steps described in the flowchart include not only the processing performed chronologically, but also the processing performed in parallel or individually rather than chronologically. Further, even in the steps processed chronologically, needless to say, the order can be appropriately changed.

Although the present disclosure and its advantages have been described in detail, it should be understood that, various changes, substitutions and alterations can be made without departing from the spirit and scope of the present disclosure as defined by the appended claims. Moreover, the term "include", "comprise" or any variant thereof in the embodiments of the present disclosure is intended to encompass nonexclusive inclusion, so that a process, a method, an article or a device including a series of elements includes not only those elements but also other elements which are not listed definitely or an element(s) inherent to the process, the method, the article or the device. The elements defined by the statement "comprising one . . . " do not exclude that there are other identical elements in the process, method, article, or device that includes the elements, if not specifically limited otherwise.

The invention claimed is:

1. A device in a wireless communication system, the device comprising processing circuitry configured to:
control, according to a sounding reference signal (SRS) configuration notified by a base station, a user equipment to transmit an SRS to the base station on corresponding time-frequency resources,
wherein the SRS configuration comprises at least SRS resource settings for implementing both uplink beam management and channel state information (CSI) acquisition,
wherein the SRS configuration indicates a starting position of each of a plurality of SRS resources and a number of OFDM symbols occupied by the each of the plurality of SRS resources, and
wherein the processing circuitry is configured to set a comb offset of the SRS resource settings to be an integer larger than or equal to zero and smaller than a sampling factor.

2. The device according to claim 1, wherein the SRS resource settings indicate a number of ports corresponding to a group of SRS resources for uplink beam management, and the number of ports can be one.

3. The device according to claim 1, wherein the SRS resource settings indicate a number of ports of a group of SRS resources for CSI acquisition, and the number of ports corresponds to a number of antenna ports of the user equipment.

4. A method for wireless communications comprising:
controlling, according to a sounding reference signal (SRS) configuration notified by a base station, a user equipment to transmit an SRS to the base station on corresponding time-frequency resources, wherein the SRS configuration comprises at least SRS resource settings for implementing both uplink beam management and channel state information (CST) acquisition, and
setting a comb offset of the SRS resource settings to be an integer larger than or equal to zero and smaller than a sampling factor,
wherein the SRS configuration further indicates a starting position of each of a plurality of SRS resources and a number of OFDM symbols occupied by the each of the plurality of SRS resources.

5. The method according to claim 4, wherein the SRS resource settings indicate a number of ports corresponding to a group of SRS resources for uplink beam management, and the number of ports can be one.

6. The method according to claim 5, wherein the SRS resource settings indicate a number of ports of a group of SRS resources for CSI acquisition, and the number of ports corresponds to a number of antenna ports of the user equipment.

7. A non-transitory computer readable medium comprising computer readable instructions that, when executed by at least one processor, cause the at least one processor to:
control, according to a sounding reference signal (SRS) configuration notified by a base station, a user equipment to transmit an SRS to the base station on corresponding time-frequency resources, wherein the SRS configuration comprises at least SRS resource settings for implementing both uplink beam management and channel state information (CS) acquisition, and
set a comb offset of the SRS resource settings to be an integer larger than or equal to zero and smaller than a sampling factor,
wherein the SRS configuration indicates a starting position of each of a plurality of SRS resources and a number of OFDM symbols occupied by the each of the plurality of SRS resources.

8. The device according to claim 1, wherein a sampling factor X indicates a subcarrier gap of X−1 between Resource Elements (REs) occupied by SRS within an OFDM symbol.

9. A device for a base station in a wireless communication system, the device comprising processing circuitry configured to:
generate a sounding reference signal (SRS) configuration for a user equipment to transmit an SRS to the base station on corresponding time-frequency resources, wherein the SRS configuration comprises at least SRS resource settings for implementing both uplink beam management and channel state information (CSI) acquisition, and wherein the SRS configuration indicates a starting position of each of a plurality of SRS resources and a number of OFDM symbols occupied by the each of the plurality of SRS resources,
wherein the processing circuitry is further configured to set a comb offset of the SRS resource setting to be an integer larger than or equal to zero and smaller than a sampling factor.

10. The device according to claim 9, wherein the SRS resource settings indicate a number of ports corresponding to a group of SRS resources for uplink beam management, and the number of ports can be one.

11. The device according to claim 9, wherein the SRS resource settings indicate a number of ports of a group of SRS resources for CSI acquisition, and the number of ports corresponds to a number of antenna ports of the user equipment.

12. The device according to claim 9, wherein a sampling factor X indicates a subcarrier gap of X−1 between Resource Elements (REs) occupied by SRS within an OFDM symbol.

13. A method for wireless communications comprising:
generating a sounding reference signal (SRS) configuration for a user equipment to transmit an SRS to a base station on corresponding time-frequency resources, wherein the SRS configuration comprises at least SRS resource settings for implementing both uplink beam management and channel state information (CST) acquisition, and wherein the SRS configuration further indicates a starting position of each of a plurality of SRS resources and a number of OFDM symbols occupied by the each of the plurality of SRS resources; and
setting a comb offset of the SRS resource setting to be an integer larger than or equal to zero and smaller than a sampling factor.

14. The method according to claim 13, wherein the SRS resource settings indicate a number of ports corresponding to a group of SRS resources for uplink beam management, and the number of ports can be one.

15. The method according to claim 14, wherein the SRS resource settings indicate a number of ports of a group of SRS resources for CSI acquisition, and the number of ports corresponds to a number of antenna ports of the user equipment.

16. The method according to claim 13, wherein a sampling factor X indicates a subcarrier gap of X−1 between Resource Elements (REs) occupied by SRS within an OFDM symbol.

\* \* \* \* \*